US012791978B2

(12) United States Patent
Oguni

(10) Patent No.: US 12,791,978 B2
(45) Date of Patent: Nov. 10, 2026

(54) IMAGE FORMING APPARATUS AND CARTRIDGE WITH ATTITUDE-REGULATING GUIDE FEATURES

(71) Applicant: CANON KABUSHIKI KAISHA, Tokyo (JP)

(72) Inventor: Atsushi Oguni, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/655,164

(22) Filed: May 3, 2024

(65) Prior Publication Data

US 2024/0385571 A1 Nov. 21, 2024

(30) Foreign Application Priority Data

May 16, 2023 (JP) ................................ 2023-080692

(51) Int. Cl.
*G03G 21/18* (2006.01)

(52) U.S. Cl.
CPC ....... *G03G 21/1842* (2013.01); *G03G 21/181* (2013.01); *G03G 21/1832* (2013.01); *G03G 2221/1609* (2013.01); *G03G 2221/1884* (2013.01)

(58) Field of Classification Search
CPC ............ G03G 21/1842; G03G 21/181; G03G 21/1853; G03G 21/1832; G03G 2221/1609; G03G 2221/1612; G03G 2221/1884
See application file for complete search history.

(56) References Cited

U.S. PATENT DOCUMENTS

| | | | | |
|---|---|---|---|---|
| 5,678,139 A * | 10/1997 | Nomura | G03G 21/1864 399/114 |
| 5,697,017 A * | 12/1997 | Rooke | G03G 21/1832 399/114 |
| 6,088,555 A * | 7/2000 | Mizuno | G03G 21/1676 399/113 |
| 2008/0145095 A1* | 6/2008 | Hoshi | G03G 21/1853 399/111 |
| 2011/0170906 A1* | 7/2011 | Matsushita | G03G 21/1832 399/114 |
| 2024/0255895 A1 | 8/2024 | Oguni et al. | G03G 21/20 |

FOREIGN PATENT DOCUMENTS

| | | |
|---|---|---|
| JP | 2006-058350 | 3/2006 |
| JP | 2006-220738 | 8/2006 |
| JP | 2006220738 A * | 8/2006 |
| JP | 2012-013827 | 1/2012 |

* cited by examiner

*Primary Examiner* — Stephanie E Bloss
*Assistant Examiner* — Laura Roth
(74) *Attorney, Agent, or Firm* — Venable LLP

(57) ABSTRACT

An image forming apparatus having an apparatus main body provided with an opening and a cartridge which can be inserted into and removed from the opening is used. The cartridge has a guided portion and a link member, the apparatus main body has a guide portion that guides the guided portion and a contact portion that is brought into contact with the link member, the cartridge is able to enter a first state where the guided portion is not in contact with the guide portion and a second state where the guided portion is in contact with the guide portion, the link member can change an attitude while being in contact with the contact portion and the cartridge can change an attitude by rotationally moving while being regulated by the link member.

10 Claims, 24 Drawing Sheets

IMAGE FORMING APPARATUS AND CARTRIDGE WITH ATTITUDE-REGULATING GUIDE FEATURES

BACKGROUND OF THE INVENTION

Field of the Invention

The present invention relates to an image forming apparatus and a cartridge.

Description of the Related Art

In an electrophotographic type image forming apparatus such as a copier and a printer in general, a drum-type electrophotographic photosensitive body (photosensitive drum) is used. In an image forming operation, after an electrostatic latent image is formed on the photosensitive drum by selectively exposing a surface of the photosensitive drum which is uniformly charged, the electrophotographic latent image on the photosensitive drum is developed by a toner. After that, transfer of a toner image on the photosensitive drum to a recording material or fixation of the transferred toner image by a heat or a pressure are performed. In the image forming apparatus as above, a process cartridge (also described simply as a "cartridge") in which a photosensitive drum, charging means, developing means, cleaning means and the like are collected in a form of a cartridge in a frame body has been put into practical use. Since the cartridge as above is detachably attachable to a main body of the image forming apparatus, toner replenishment and maintenance of various types of process means can be implemented easily.

In the apparatus main body of the cartridge-type image forming apparatus as above, an opening, through which the cartridge is inserted or removed (also described altogether as "insertion/removal" or "attachment/detachment"), is provided. Moreover, a door member capable of being opened/closed is mounted on the apparatus main body, and in a state where the door member is open, the inside of the opening is exposed to an outside of the apparatus, whereby the cartridge can be inserted or removed. Moreover, in the apparatus main body, a guide member for guiding the cartridge to an attachment position is provided, and a guided portion to be brought into contact with the guide member is provided in the cartridge. The insertion/removal of the cartridge with respect to the image forming apparatus is performed in a state where the guide member and the guided portion are mutually in contact. Here, it is preferable that an attitude or trajectories of insertion and removal (insertion/removal trajectory) of the cartridge with respect to the image forming apparatus is regulated all the time in order to prevent deteriorated operability or breakage caused by or contact.

In recent years, in response to a demand for size reduction of the image forming apparatus, the arrangement of units in the apparatus main body has become closer, resulting in narrower openings. On the other hand, there is a demand for a larger capacity for the cartridge in order to reduce a cartridge replacement frequency for a user, and correspondingly, there is also a tendency that sizes of a toner container and a waste toner container of a cartridge are becoming larger. As a result, in recent years, there has been a demand that a cartridge with a large capacity is inserted/removed through a narrow opening of the small-sized apparatus main body while avoiding various units disposed in the apparatus. In this case, when it is difficult to insert or remove the cartridge without changing an attitude or the insertion/removal trajectory of the cartridge, it is necessary to regulate the attitude or the insertion/removal trajectory of the cartridge in the vicinity of the opening. However, since there is no guide member before the insertion of the cartridge, regulating or changing the attitude or the insertion/removal trajectory of the cartridge in the vicinity of the opening is difficult.

On the other hand, as indicated in the Japanese Patent Application Publication No. 2006-058350, for example, there is a method of making a guidable range for the attitude or the insertion/removal trajectory of the cartridge longer by forming a part of the opening/closing door as a guide portion. In addition, a method of guiding the cartridge from outside the opening has been also considered by making the guide portion movable.

SUMMARY OF THE INVENTION

However, the method of using the part of the opening/closing door as the guide portion or the method of making the guide portion movable as described above involves increases in component size, an increase in the number of components, and increased complexity of mechanisms. Therefore, there is concern that these methods may lead to higher manufacturing costs or greater resource consumption.

The present invention has been made in view of the aforementioned problems and has an object to provide, in an image forming apparatus in which a cartridge can be inserted/removed, an image forming apparatus, a cartridge, and a method that preferably enables insertion/removal of the cartridge without incurring higher manufacturing costs or greater resource consumption.

The present invention provides an image forming apparatus including an apparatus main body provided with an opening and a cartridge configured to be inserted into or removed from the apparatus main body through the opening. The cartridge has a guided portion and a link member. The apparatus main body has a guide portion configured to guide the guided portion and a contact portion which is capable of being in contact with the link member. The cartridge is capable of being in a first state and a second state. In the first state, the guided portion is not in contact with the guide portion, and in the second state, the guided portion is in contact with the guide portion. In the second state, the link member is able to change an attitude while being in contact with the contact portion, and the cartridge is able to change the attitude by rotationally moving while being regulated by the link member. The present invention also provides a cartridge including a guided portion and a link member. The cartridge is capable of being inserted into or removed from an apparatus main body through an opening of the apparatus main body. The apparatus main body has a guide portion configured to guide the guided portion and a contact portion which is capable of being in contact with the link member. The cartridge is capable of being in a first state and a second state. In the first state, the guided portion is not in contact with the guide portion, and in the second state, the guided portion is in contact with the guide portion. In the second state, the link member can change an attitude while being in contact with the contact portion, and the cartridge can change the attitude by rotationally moving while being regulated by the link member.

According to the present invention, in the image forming apparatus in which the cartridge can be inserted/removed, the image forming apparatus, the cartridge and method preferably enables insertion/removal of the cartridge without incurring higher manufacturing costs or greater resource consumption.

Further features of the present invention will become apparent from the following description of exemplary embodiments with reference to the attached drawings.

DESCRIPTION OF THE EMBODIMENTS

Preferred embodiments of the present invention will be explained in an exemplifiable manner in detail with reference to the following drawings. However, dimensions, materials, shapes, relative dispositions thereof and the like of components described in the embodiments are not intended to limit the range of this invention to them unless otherwise specified in particular. Moreover, the materials, shapes and the like of members explained once in the subsequent explanation are similar to those in the initial explanation also in the subsequent explanation unless otherwise specified in particular. To configurations or processes not particularly illustrated or described, well-known arts or publicly-known arts in the technical field concerned can be applied.

Embodiment 1

Figure 1:
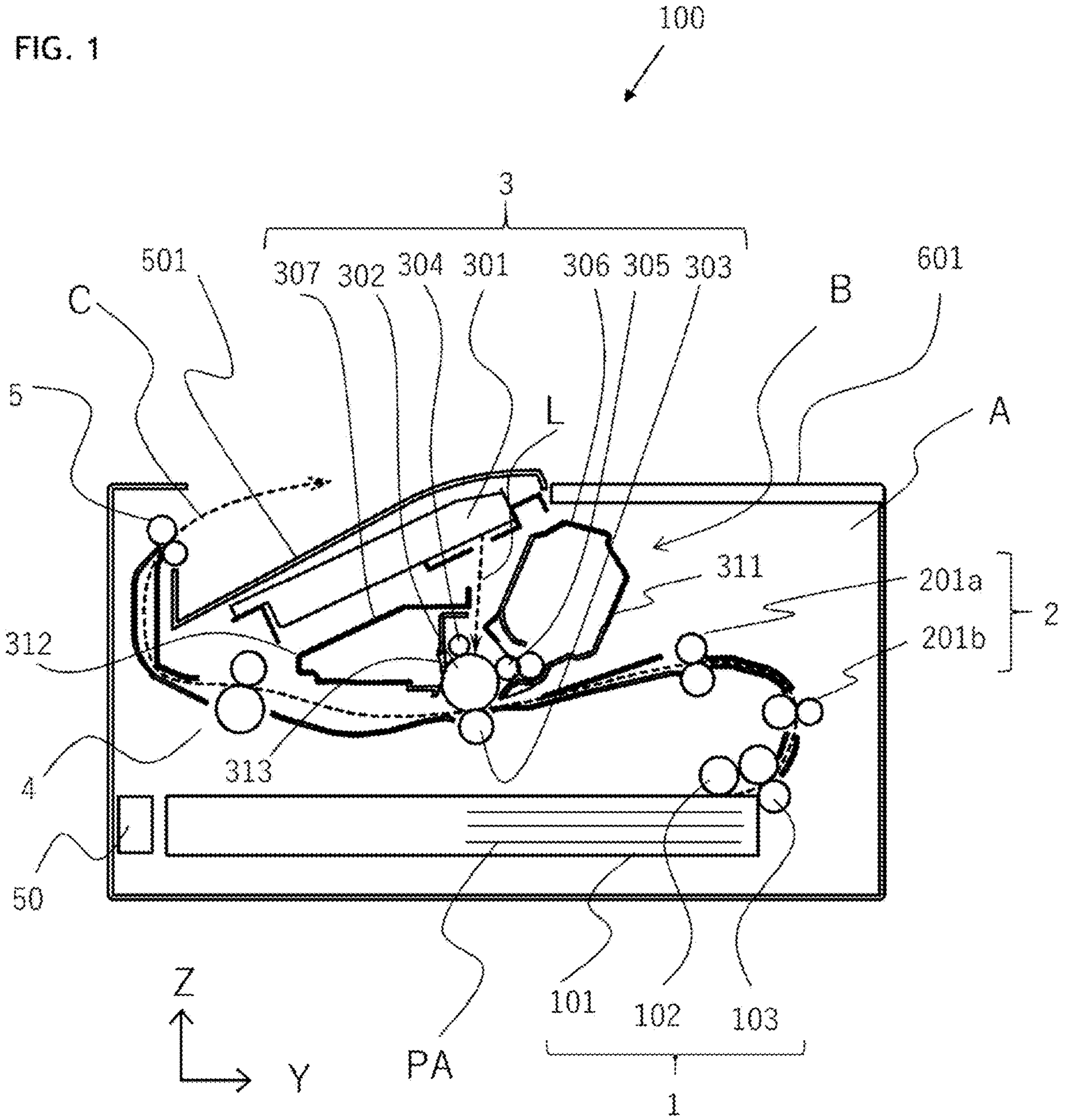
FIG. 1 is a schematic sectional diagram of an image forming apparatus.

Hereinafter, an Embodiment 1 of the present invention will be explained in detail on the basis of the drawings. First, an entire configuration and image forming processes will be explained by using FIG. 1. FIG. 1 is a schematic sectional view of an electrophotographic image forming apparatus in the Embodiment 1 (Hereinafter, referred to as an “image forming apparatus 100”). It is to be noted that those other than the parts explained in this embodiment are omitted or simplified.

The image forming apparatus 100 includes an apparatus main body A and a process cartridge (hereinafter, described as a “cartridge B”). Here, the apparatus main body A is a part excluding the cartridge B from the image forming apparatus 100. It is to be noted that the right side in FIG. 1 is assumed to be a front side of the apparatus main body A, and from now on, a left-right direction of the apparatus main body A is assumed to be the left-right direction when the apparatus main body A is viewed from the front side for convenience. That is, a depth side on the paper is the right side of the apparatus main body A, and a front side is the left side of the apparatus main body A. Moreover, the front side is assumed to be a Y-direction+, a rear side as a Y-direction−, the right side when viewed from the front side as an X-direction+, the left side as an X-direction−. Moreover, in an apparatus installed state, an upper side in a gravity direction is assumed to be a Z-direction+, and a lower side as a Z-direction−.

Overall Configuration of Image Forming Apparatus

The image forming apparatus 100 shown in FIG. 1 is a laser-beam printer using the electrophotographic technology. To the apparatus main body A, the cartridge B can be detachably attached. The cartridge B roughly includes a photosensitive drum 302 as an image bearing member, a developing roller 305 which supplies a toner, which is a developer accommodated in a developing unit 311, to the photosensitive drum 302, a cleaning unit 312 having a cleaning member 313, and a charging roller 304.

A laser scanner unit as an exposing device (hereinafter, described as a “scanner 301”) is disposed in the apparatus main body A at a position capable of emitting a laser to the photosensitive drum 302 of the cartridge B in a state attached to the apparatus main body A. When the scanner 301 emits the laser to the photosensitive drum 302 charged to a predetermined potential by the charging roller 304 on the basis of image information, an electrostatic latent image is formed on a surface of the photosensitive drum.

On a lower part of the apparatus main body A, a sheet accommodating portion 101 accommodating a recording medium to be an image forming target (hereinafter, described as a “sheet PA”) is disposed. Moreover, on the apparatus main body A, a paper-feed portion 1, a conveyance portion 2, an image forming portion 3, a fixing portion 4, and a paper-ejection portion 5 are sequentially disposed along a conveying direction C (broken-line arrow) of the sheet PA. It is to be noted that, in addition to the sheet accommodating portion 101, there are configurations of the image forming apparatus that include a paper-feed portion, a multi-stage paper-feed portion, a multi-stage paper-ejection portion, and a configuration in which automatic double-sided printing is made possible by conveying the sheet PA to a reversing portion or the like. In this case, illustration and explanation of these mechanisms are omitted.

The image forming apparatus 100 communicates with an external information processing apparatus (not shown) to receive image information or to accept an instruction to execute an image forming operation. Moreover, the apparatus main body A includes a control portion 50 for executing a series of controls. The control portion 50 is an information processing device including arithmetic resources such as a processor and a memory, for example. The control portion 50 executes various controls by communicating with each constituent element in the apparatus.

Image Forming Process

Subsequently, a series of operations by the image forming apparatus 100 will be explained, including an image forming process. When the control portion 50 receives a print-start signal from the external information processing apparatus, processing is started. A pickup roller 102 and a separating portion 103 in the paper-feed portion 1 feeds one sheet PA accommodated in the sheet accommodating portion 101 to a conveyance path. The conveyance portion 2, having a first conveyance roller pair 201*a* and a second conveyance roller pair 201*b*, conveys the fed sheet PA along the conveyance path. The conveyed sheet PA is supplied to the image forming portion 3 including the scanner 301, the photosensitive drum 302, a transfer roller 303, the charging roller 304, the developing roller 305, a toner container 306, and a waste-toner container 307.

When the sheet PA has been conveyed to a predetermined position, an image-forming start signal is issued by the control portion 50. For example, a sheet distal-end detecting portion, not shown, may be provided in the conveyance portion 2. With the configuration as above, the image forming process can be started on the basis of the image-forming start signal issued by the control portion 50 when the sheet distal end is detected. When the image-forming process is started, the charging roller 304, which is a charging member to which a bias voltage is applied, uniformly charges an outer peripheral surface of the photosensitive drum 302.

The scanner 301 outputs a laser beam L corresponding to the image information. The laser beam L scans/exposes the outer peripheral surface of the photosensitive drum 302. As a result, on the outer peripheral surface of the photosensitive drum 302, an electrostatic latent image corresponding to the image information is formed.

On the other hand, the toner in the cartridge B is borne by the developing roller 305 and is supplied to the photosensitive drum 302. As a result, the electrostatic latent image on the photosensitive drum is visualized as a toner image.

The sheet PA is conveyed to a place between the photosensitive drum 302 and the transfer roller 303 having elasticity. The transfer roller 303 is constantly pressurized by an elastic member, not shown, to the photosensitive drum 302, and a transfer nip is formed between the photosensitive drum 302 and the transfer roller 303. When the sheet PA passes through this transfer nip, the toner image is transferred from the photosensitive drum 302 to the sheet PA.

The sheet PA to which the toner image has been transferred is separated from the photosensitive drum 302 and is conveyed to the fixing portion 4. Then, by means of performance of pressurizing/heating and fixing processing at the nip portion formed at the fixing portion 4, the toner image is fixed on the sheet PA. The sheet PA which was subjected to the fixing processing of the toner image reaches the paper-ejection portion 5 and is ejected to a paper-ejection tray 501 outside the main body.

Cartridge Attachment Subsequently, attachment of the cartridge will be explained. First, a part related to the cartridge attachment in the apparatus main body A in this Embodiment will be explained.

Figure 2:
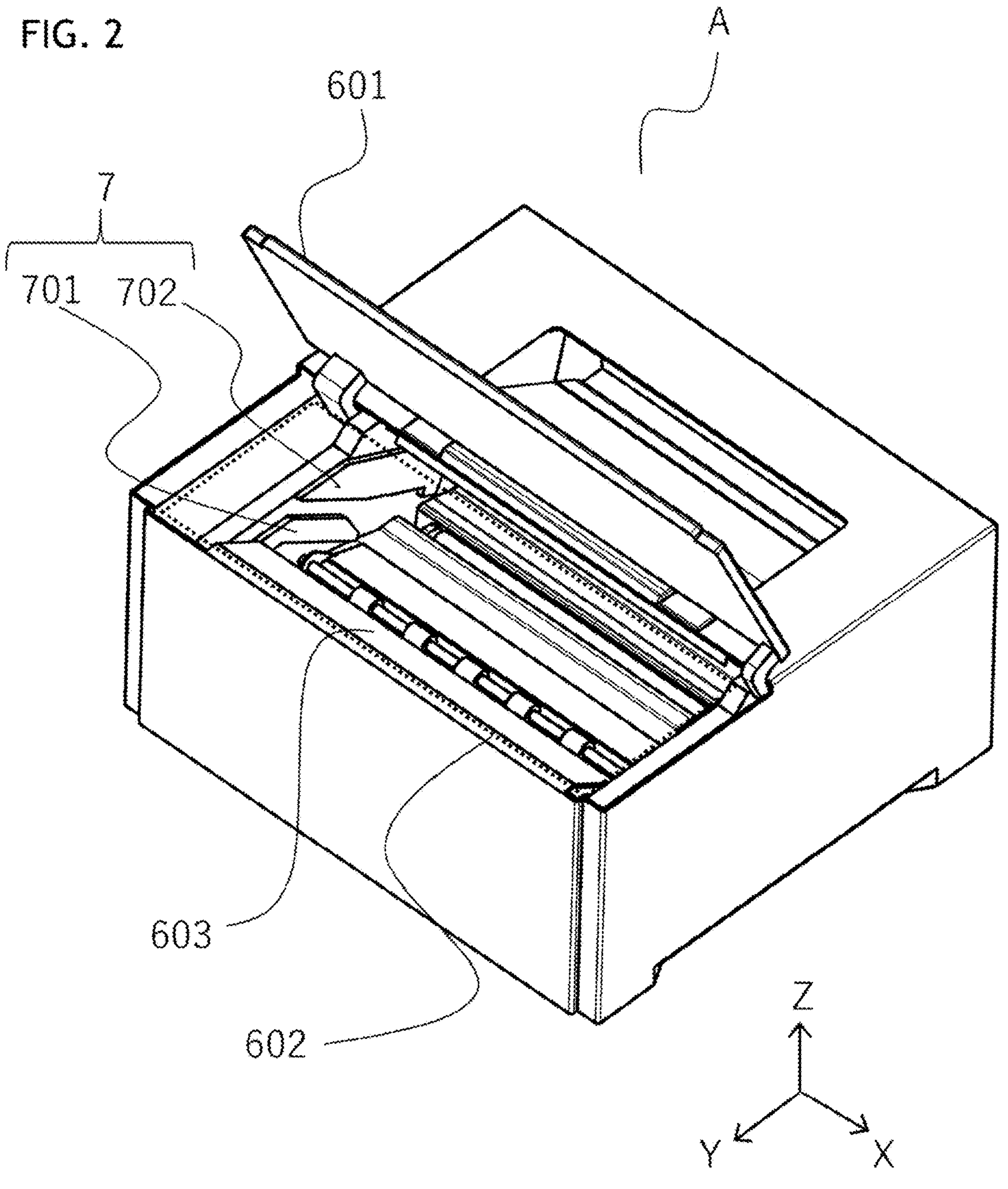
FIG. 2 is a perspective view of an apparatus main body A of the image forming apparatus.
Figure 3:
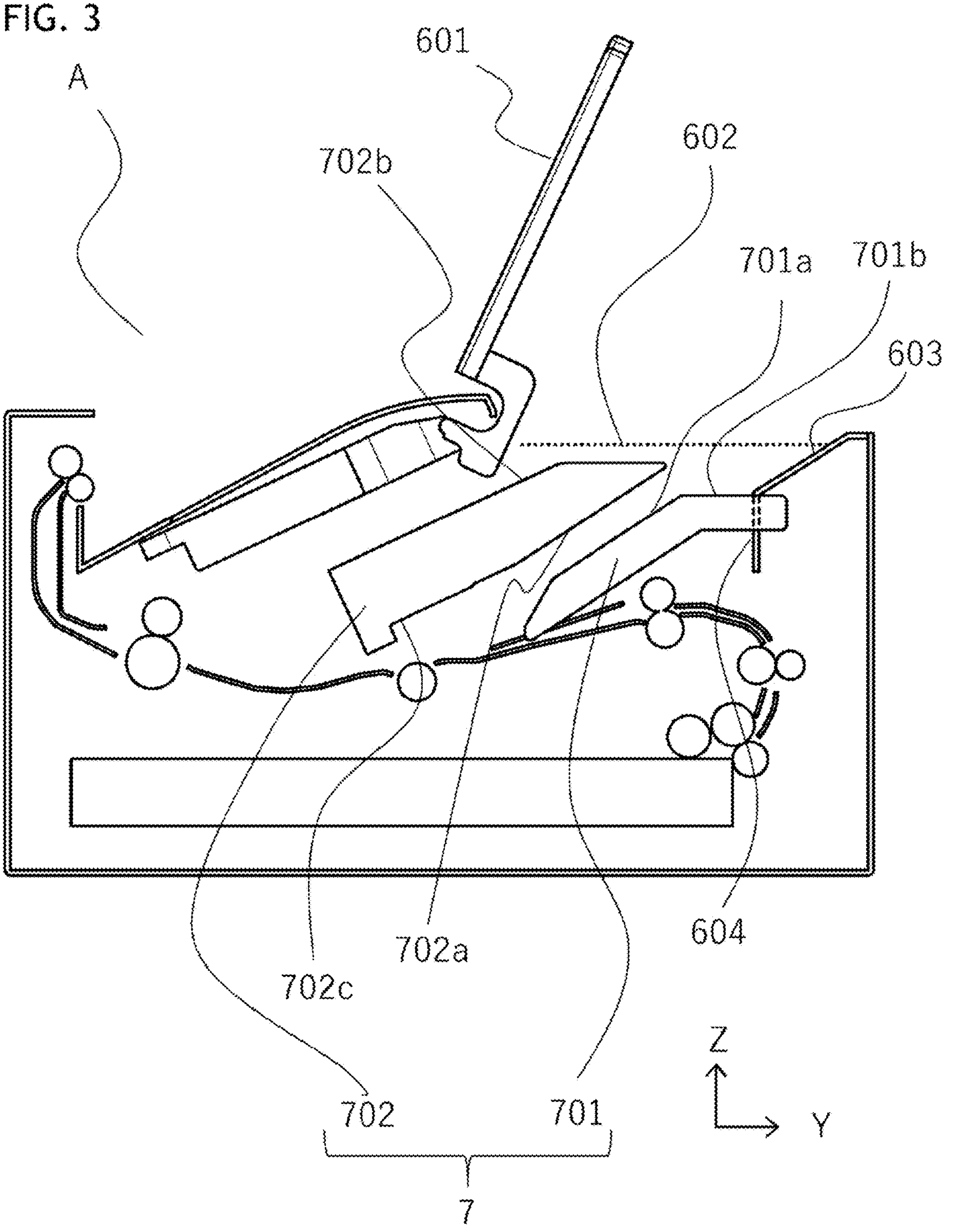
FIG. 3 is an explanatory diagram of a guide portion of an Embodiment 1.

FIG. 2 is a perspective view of the apparatus main body A viewed from upper right. An opening/closing door 601 is disposed on an upper front side of the apparatus main body A. FIG. 2 illustrates a state in which the opening/closing door 601 is open by rotationally moving to the upper side. In the state in FIG. 2, in a state where the opening/closing door 601 is open, an opening 602, which is an opening portion continuing to an inside of the apparatus main body A, is brought into a state exposed to the outside of the apparatus. Insertion/removal of the cartridge is performed in this state. On the other hand, by means of the rotational movement of the opening/closing door 601 to the lower side from the state in FIG. 2, such a state is brought about that the opening 602 is covered with the opening/closing door 601. The image forming operation on the sheet PA is performed in this state. Moreover, FIG. 3 is a sectional view of the apparatus main body A shown in FIG. 2, when viewed form a left side so that a lower guide member 701 and an upper guide member 702 can be confirmed. FIG. 3 also shows a state where the opening/closing door 601 is open.

The apparatus main body A has a guide portion 7 for guiding the cartridge B at the time of insertion/removal. The guide portion 7 includes the lower guide member 701 and the upper guide member 702. The guide portion 7 is fixed to the apparatus main body A. It is to be noted that, in this Embodiment, the guide portion 7 is similarly disposed on both right and left of the apparatus main body A (FIG. 2 and FIG. 3 illustrate only the guide portion 7 on the left side). Moreover, the part having a shape corresponding to the guide portion 7 in the cartridge B is also disposed on both right and left sides. Hereinafter, only the left side of the apparatus main body A will be explained, while the right side will be omitted since it has similar configuration/operation.

On the front side of the apparatus main body A, a cover portion 603 protruding to the guide portion 7 side is provided. In this Embodiment, the apparatus main body A has a second paper-feed port, not shown, and an upper part of the second paper-feed port is covered with the cover portion 603. Moreover, the cover portion 603 has a stop portion 604 formed having a wall-shape lowered substantially perpendicularly.

The guide portion 7 will be explained with reference to FIG. 3. The guide portion 7 is constituted by the lower guide member 701 and the upper guide member 702 and is fixed to the apparatus main body A. The lower guide member 701 has a guide portion 701*a*, which is a slope with an angle with respect to a horizontal plane, and the guide portion 701*a* is formed at a position hidden by the opening/closing door 601 in the apparatus main body A, when the opening/closing door 601 is closed. The guide portion 701*a* in the illustrated example is provided on the lower side of the opening 602 and is disposed such that it does not hit the opening/closing door 601, even if the opening/closing door 601 is opened/closed. Moreover, the lower guide member 701 has a contact portion 701*b* continuing to the guide portion 701*a*. In this Embodiment, the contact portion 701*b* extends in a substantially horizontal direction, but it may be a plane with an angle with respect to the horizontal depending on the form.

The upper guide member 702 is fixed to an upper part of the lower guide member 701. The upper guide member 702 has a regulating portion 702*a*. The regulating portion 702*a* is formed having a certain distance to the guide portion 701*a* of the lower guide member 701. Moreover, the upper guide member 702 has a rotation-retaining contact portion 702*b* on the upper side to be brought into contact with a rotation-retaining portion provided in the cartridge B, which will be described later. Moreover, the upper guide member 702 has an attachment-time regulating portion 702*c* to be brought into contact with a guided portion when the attachment of the cartridge B is completed. It is to be noted that the guide portion 7 has a mechanism related to an electric contact for power supply to the cartridge B (not shown).

Figure 4:
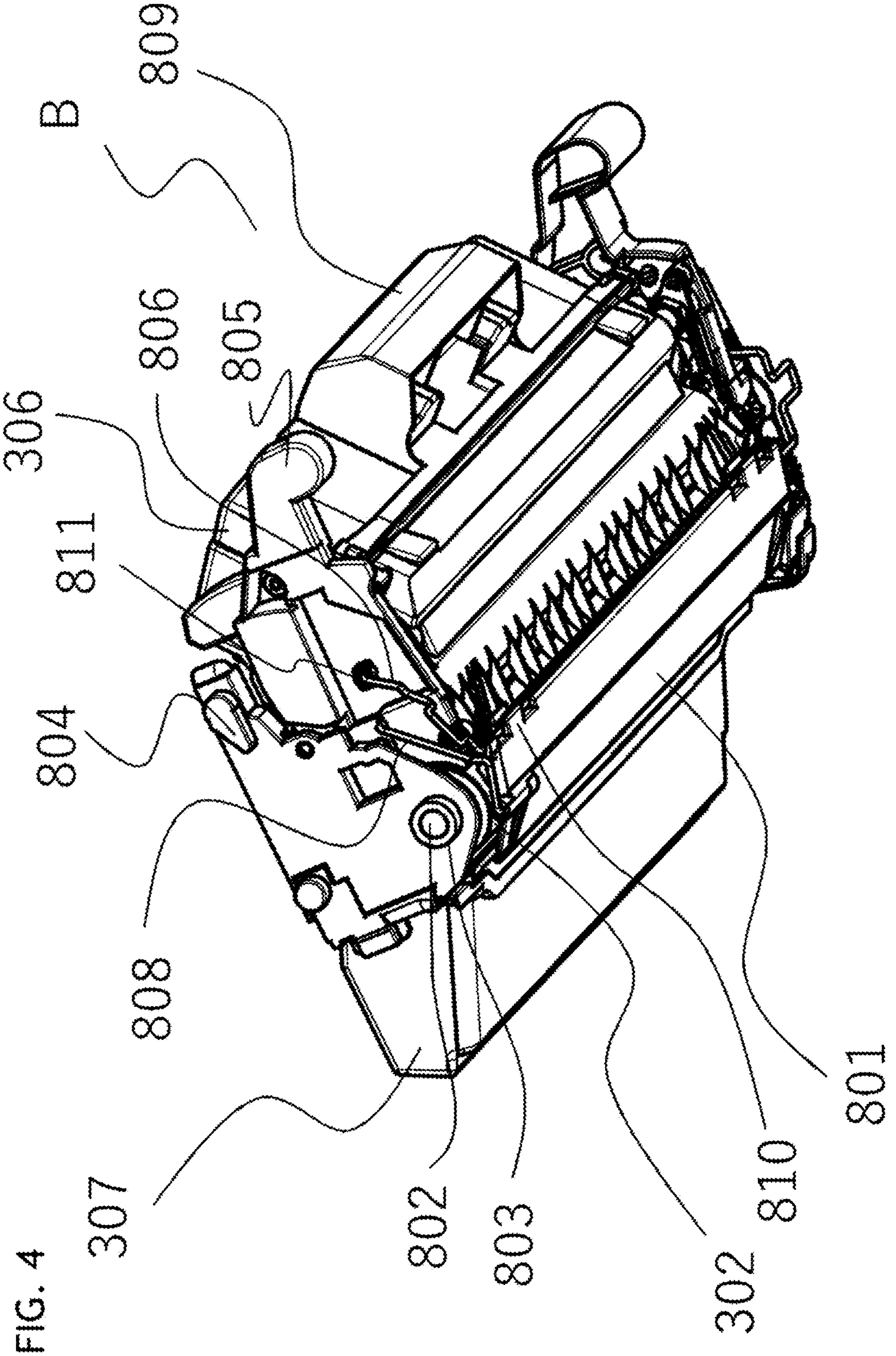
FIG. 4 is a perspective view of a state where a shutter of a cartridge B in the Embodiment 1 is closed.
Figure 5:
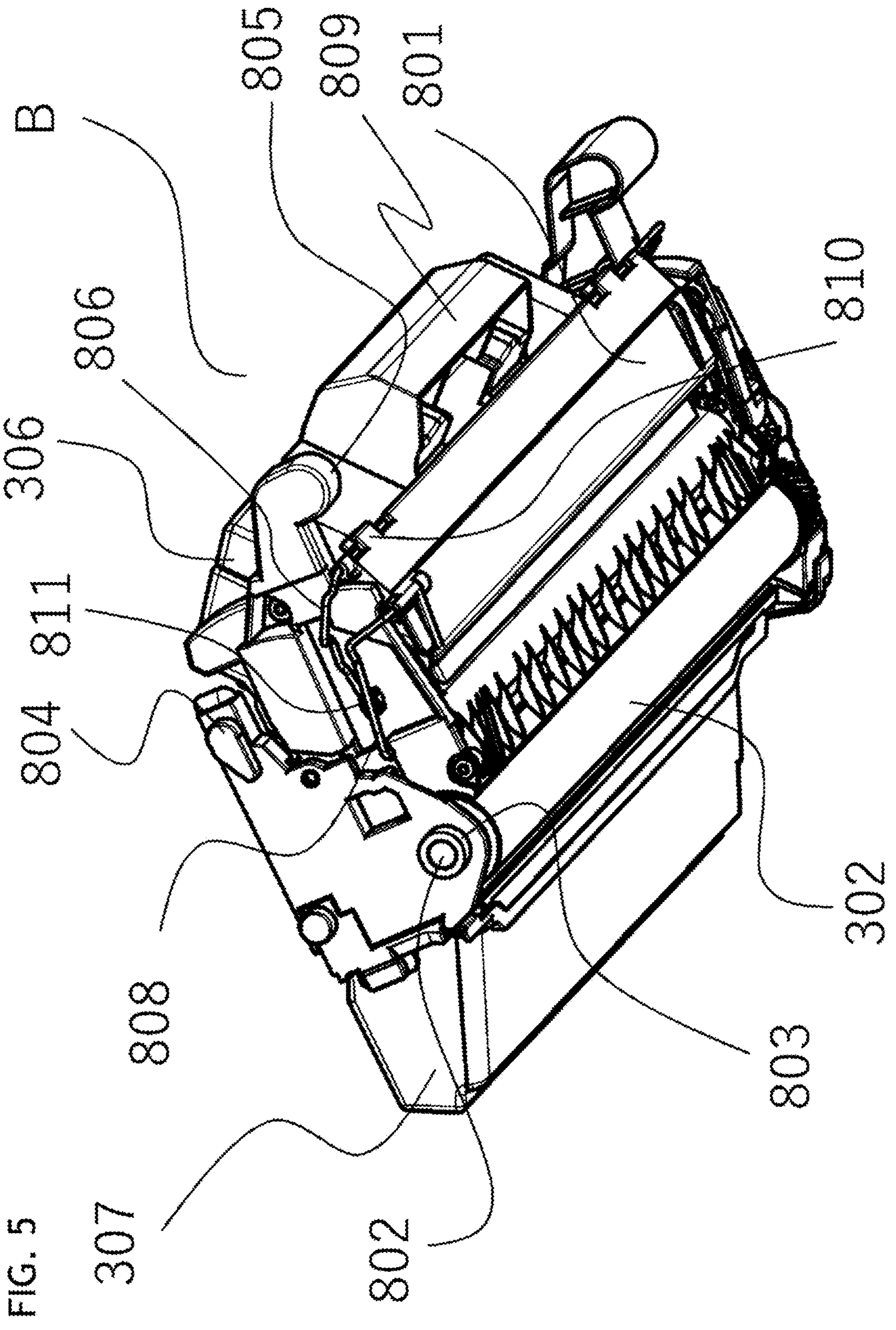
FIG. 5 is a perspective view of a state where the shutter of the cartridge B in the Embodiment 1 is open.
Figures 6A, 6B:
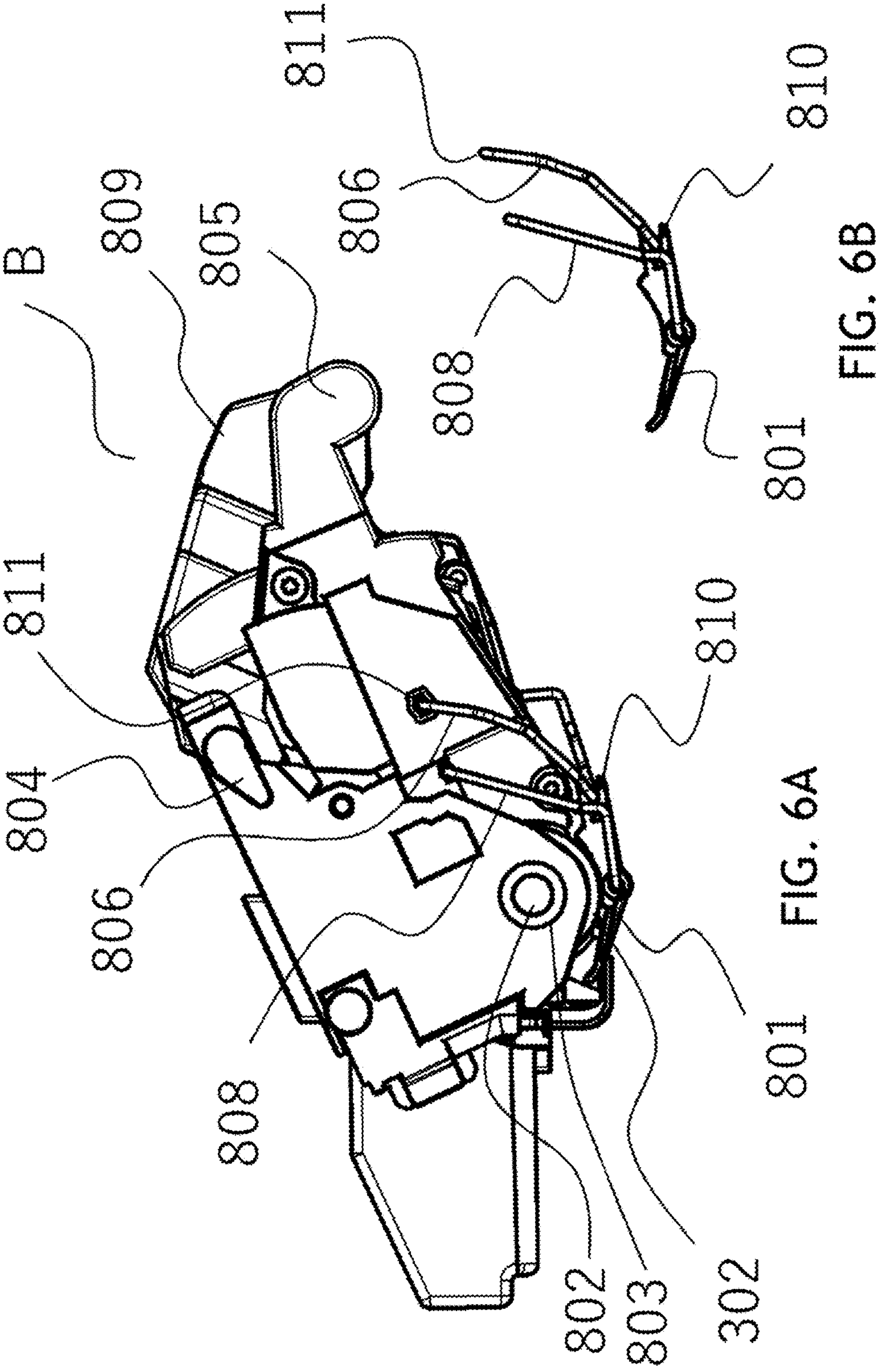
FIGS. 6A and 6B are side views of a state where the shutter of the cartridge B of the Embodiment 1 is closed.

Subsequently, with reference to FIG. 4 to FIGS. 8A and 8B, the cartridge B will be explained. The cartridge B in this Embodiment has a drum shutter 801 for protecting a surface of the photosensitive drum 302 in a state of being placed outside the apparatus main body A. FIG. 4 is a perspective view of a state where the drum shutter 801 of the cartridge B is closed, when the cartridge B is viewed from a lower left side of the apparatus main body A. In the state in FIG. 4, the photosensitive drum 302 can be protected, when the cartridge B is not attached to the apparatus main body A. FIG. 5 is a perspective view of a state where the drum shutter 801 of the cartridge B is open, when the cartridge B is viewed from the lower left side of the apparatus main body A. When the cartridge B is attached to the apparatus main body A in the state in FIG. 5, image formation can be performed. FIGS. 6A and 6B and FIGS. 7A to 7C are side views when the cartridge B is viewed from a left direction of the main body. FIGS. 6A and 6B correspond to a state where the drum shutter 801 is closed, and FIGS. 7A to 7C to the state where the drum shutter 801 is open. It is to be noted that the cartridge B has a mechanism related to an electric contact for power supply (not shown).

The photosensitive drum 302 provided in the cartridge B is rotatably supported by a photosensitive-drum center shaft 802 inserted from an outer side. The photosensitive-drum center shaft 802 is covered with a cylindrical shaped portion. This cylindrical shaped portion is brought into contact with the guide portion 701*a* at the insertion/removal of the cartridge B. The cylindrical shaped portion may be constituted by a member such as a cap or may be constituted integrally with the center shaft 802. In this Embodiment, the cylindrical shaped portion is made a guided portion 803. Moreover, the cartridge B has a rotation retaining portion 804 for regulating an attitude in a completely attached state and a provisional rotation-retaining portion 805 for temporarily regulating the insertion/removal trajectory and the attitude.

Figure 7B:
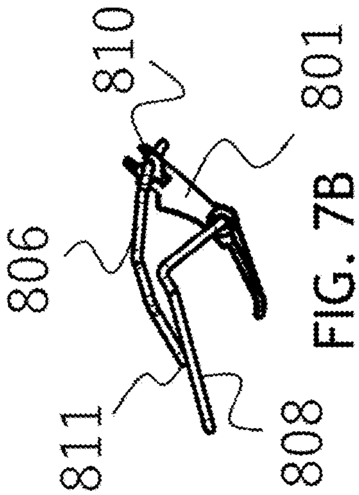
FIGS. 7A to 7C are side views of a state where the shutter of the cartridge B of the Embodiment 1 is open.
Figure 7C:
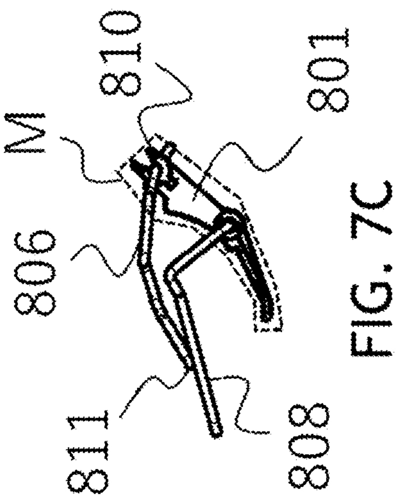
Figure 7A:
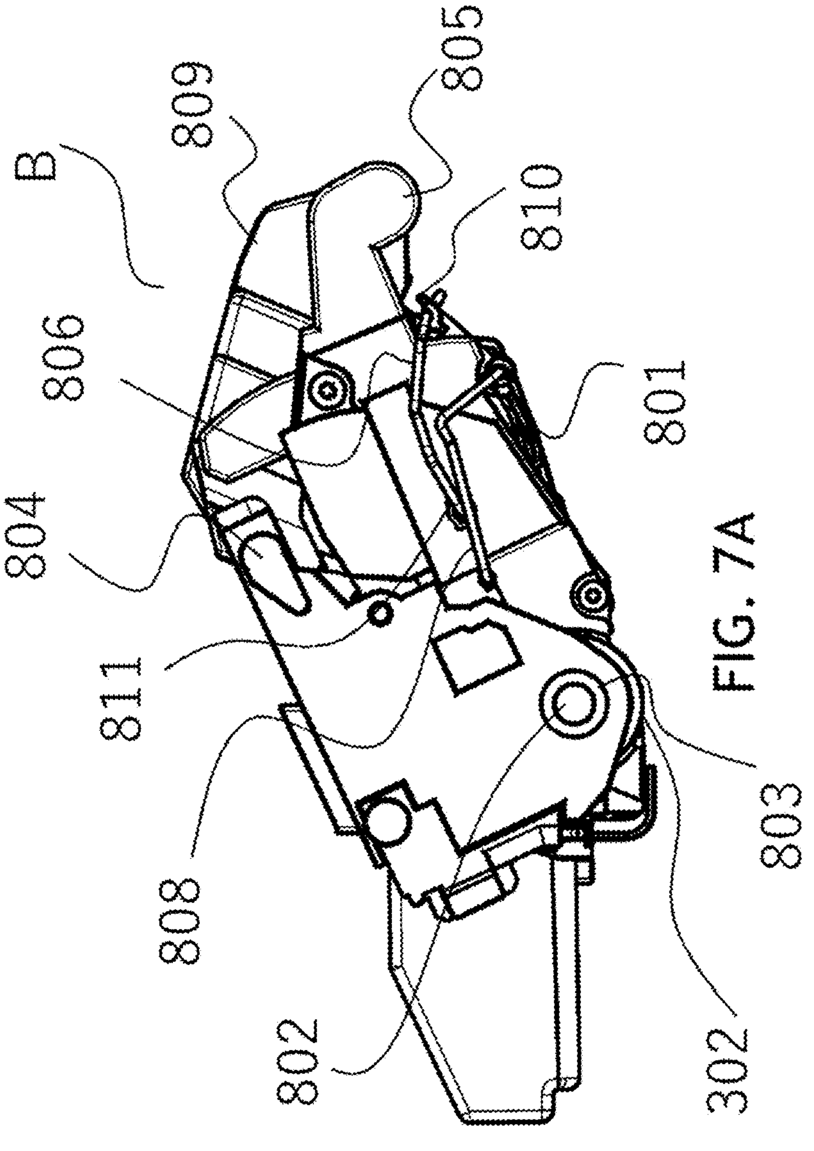

FIG. 4 illustrates a state where the drum shutter 801 is closed, that is, a state where the cartridge B is outside the apparatus main body A. FIG. 5 illustrates a state where the drum shutter 801 is open, that is, a state where the cartridge B is attached to the apparatus main body A. Moreover, FIG. 6A illustrates a state where the drum shutter 801 is closed. FIG. 6B illustrates the drum shutter portion in the state in FIG. 6A in an extracted manner. FIG. 7A illustrates a state where the drum shutter 801 is open. FIG. 7B illustrates the drum shutter portion in the state in FIG. 7A in an extracted manner.

Figure 8A:
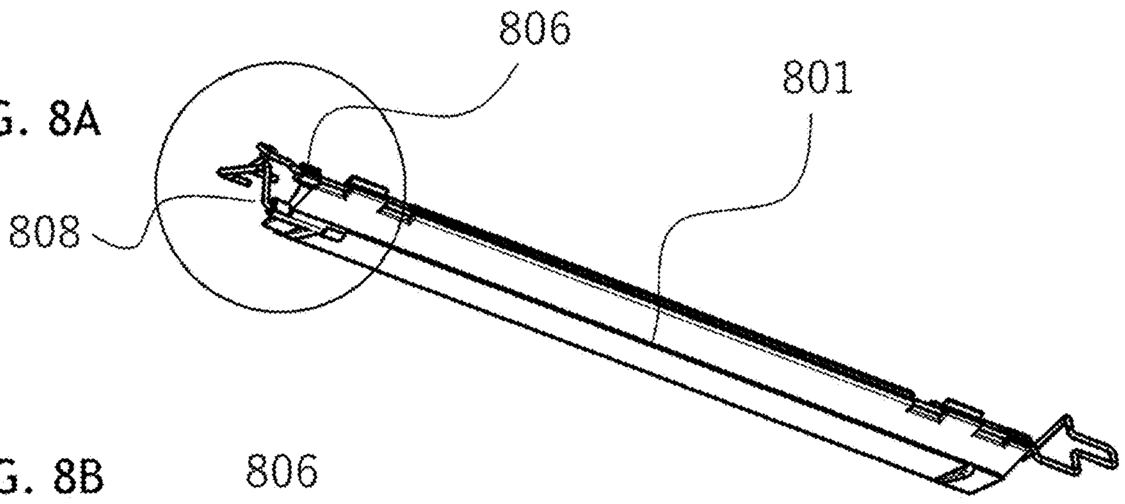
FIGS. 8A and 8B are explanatory diagrams of a link member and a drum shutter of the Embodiment 1.
Figure 8B:
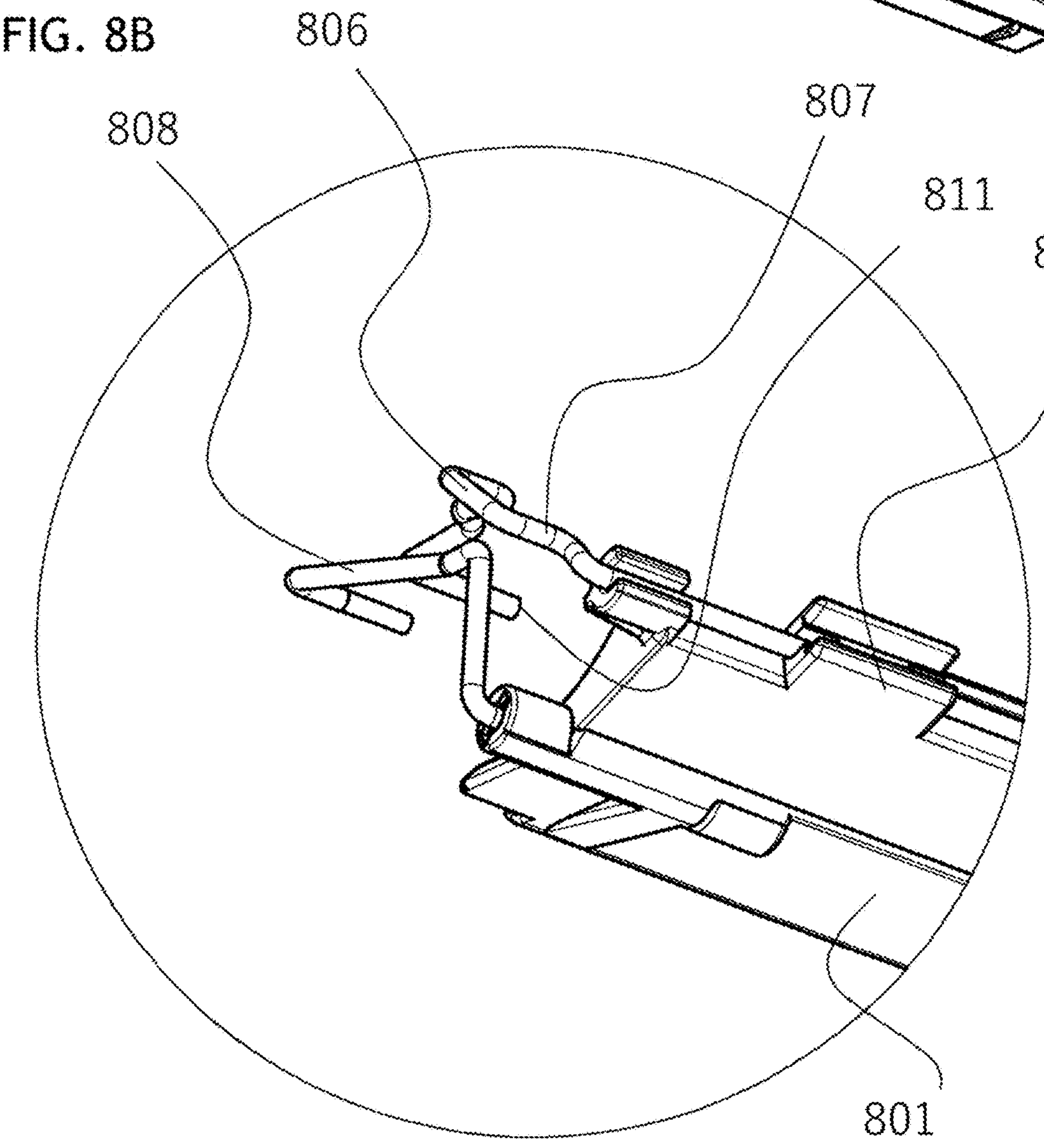

FIGS. 8A and 8B illustrate the drum shutter 801, a link member 806 coupled therewith, and an auxiliary link member 808 in an extracted manner. It is to be noted that FIG. 8A is an overall view, and FIG. 8B is a left-side enlarged view (corresponding to a part surrounded by a circle in the overall view). The drum shutter 801 is provided capable of rotational movement by the link member 806 with respect to the cartridge B. The link member 806 in this Embodiment has a link-member rotation center 811 closer to an upstream side than the guided portion 803 with respect to an insertion direction of the cartridge B, and the drum shutter 801 is connected to an end on an opposite side thereof.

As illustrated in FIG. 4 to FIGS. 8A and 8B, in this Embodiment, the auxiliary link member 808 is provided capable of rotational movement with respect to the cartridge B between the link-member rotation center 811 of the link member 806 and the guided portion 803 and is connected also to the drum shutter 801 rotationally movably. As a result, the drum shutter 801 and the link member 806, the auxiliary link member 808 operate as a four-joint link. It is to be noted that, other than the four-joint link mechanism as above, configurations such as use of an urging member and the like or configurations not using the auxiliary link member 808 are possible.

And the drum shutter 801 is, as shown in FIG. 6A, urged by an urging member, not shown, outside the apparatus main body A and covers the surface of the photosensitive drum 302. Moreover, it does not rotate in a clockwise direction (arrow G direction) exceeding a position in FIG. 6A, that is, the position where the drum shutter 801 is closed.

Moreover, as shown in FIG. 8B, the link member 806 is formed by bending a wire material. And a contacted portion 807 is formed by bending the wire material so as to protrude outward with respect to the cartridge B. The contacted portion 807 on the cartridge B side is brought into the contact portion 701*b* of the apparatus main body A together with the guided portion 803 as the cartridge is inserted and is positioned.

The drum shutter 801 has a drum-shutter contact portion 810. Since the drum shutter 801 is operated in relation with an operation of the link member 806, the position of the drum-shutter contact portion 810 is also operated in relation with the operation of the link member 806.

Here, the cartridge B has a handle portion 809 in a front-side direction of the apparatus main body A with respect to the photosensitive drum 302 (see FIG. 4). When the cartridge B is inserted/removed, a user holds the handle portion 809, but if the user does not intentionally lift up the cartridge B, a gravity force acts, and the guided portion 803 is inserted/removed while in contact with the contact portion 701*b* and the guide portion 701*a*. In this embodiment, the insertion/removal is performed in this state.

Figure 9A:
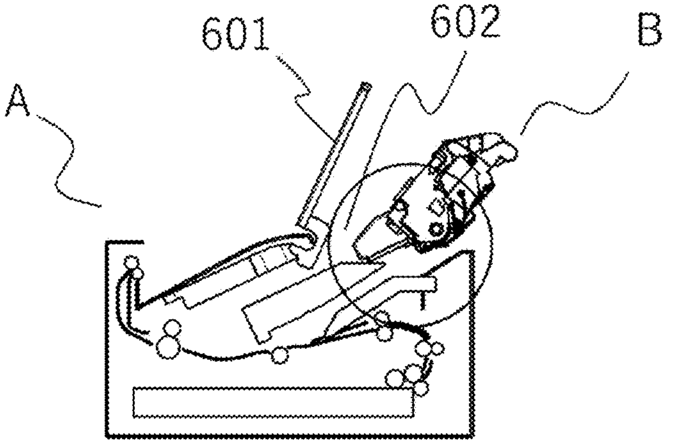
FIGS. 9A and 9B are diagrams illustrating a state before insertion of the cartridge B of the Embodiment 1.
Figure 9B:
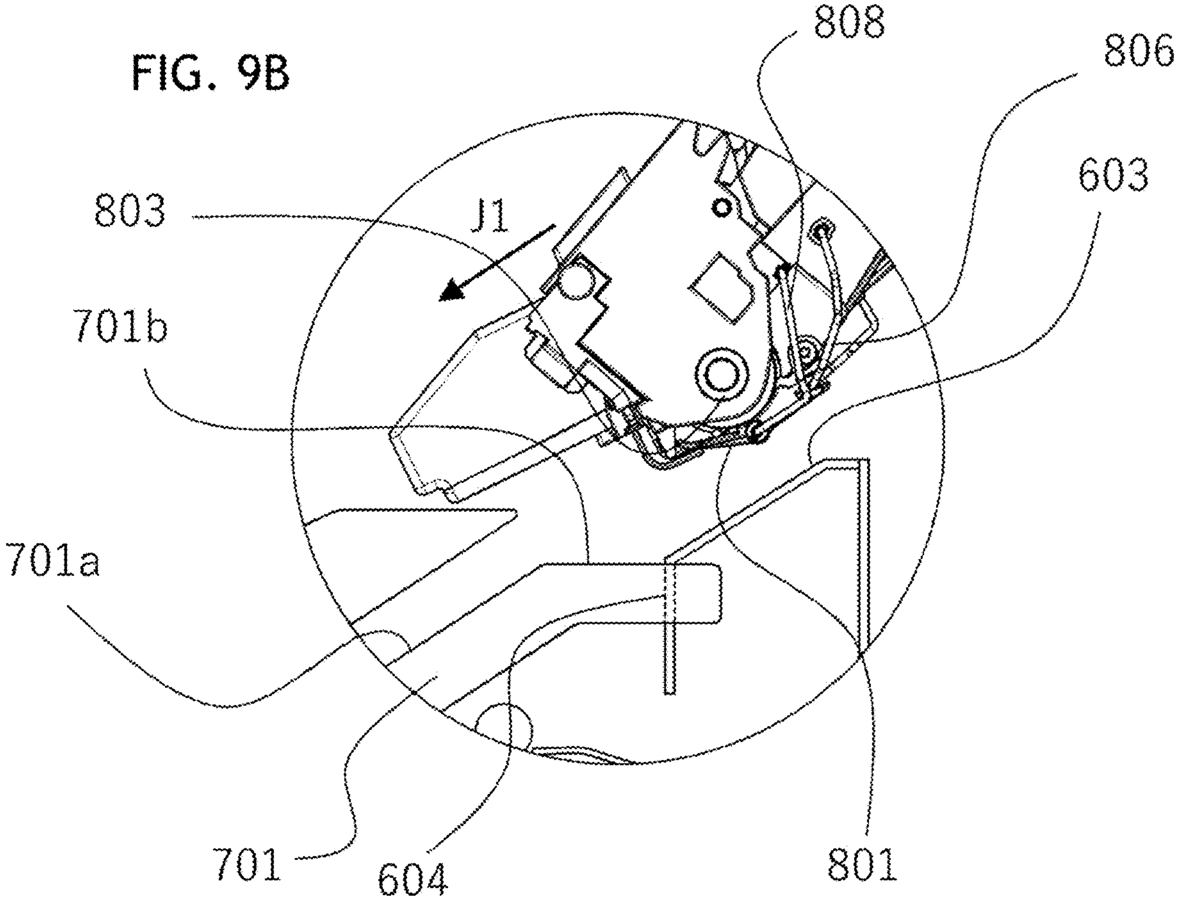

Subsequently, the attachment of the cartridge will be explained with reference to FIGS. 9A and 9B to FIGS. 14A and 14B. FIGS. 9A and 9B illustrate a state immediately after the insertion of the cartridge B is started in a state where the opening/closing door 601 of the apparatus main body A is open, and the cartridge B is still outside the apparatus main body A. FIGS. 9A and 9B are sectional diagrams that a relation between the vicinity of the guide portion 7 in the apparatus main body A and the left side of the cartridge B. These are virtual diagrams illustrating a state in which wall surface on the left side of the apparatus main body A is removed so that the guide portion 7 is exposed. FIG. 9A is an overall view, and FIG. 9B is an enlarged view of the portion surrounded by a circle in FIG. 9A (in the vicinity of the opening 602. Moreover, portions not used in the explanation of this embodiment are omitted from the description. Similarly for the subsequent figures, FIGS. 10A and 10B to FIGS. 14A and 14B, A is an overall view and B is an enlarged view of the portion surrounded by a circle in A. At the time in FIGS. 9A and 9B, the drum shutter 801 is in a state of covering the surface of the photosensitive drum 302. When the insertion of the cartridge B progresses in the direction of an arrow J1 from FIGS. 9A and 9B, the state transfers to a state in FIGS. 10A and 10B.

Figure 10A:
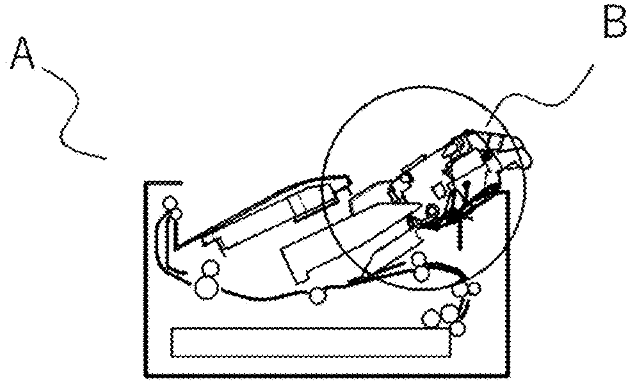
FIGS. 10A and 10B are diagrams illustrating a state in the middle of the insertion of the cartridge B of the Embodiment 1.
Figure 10B:
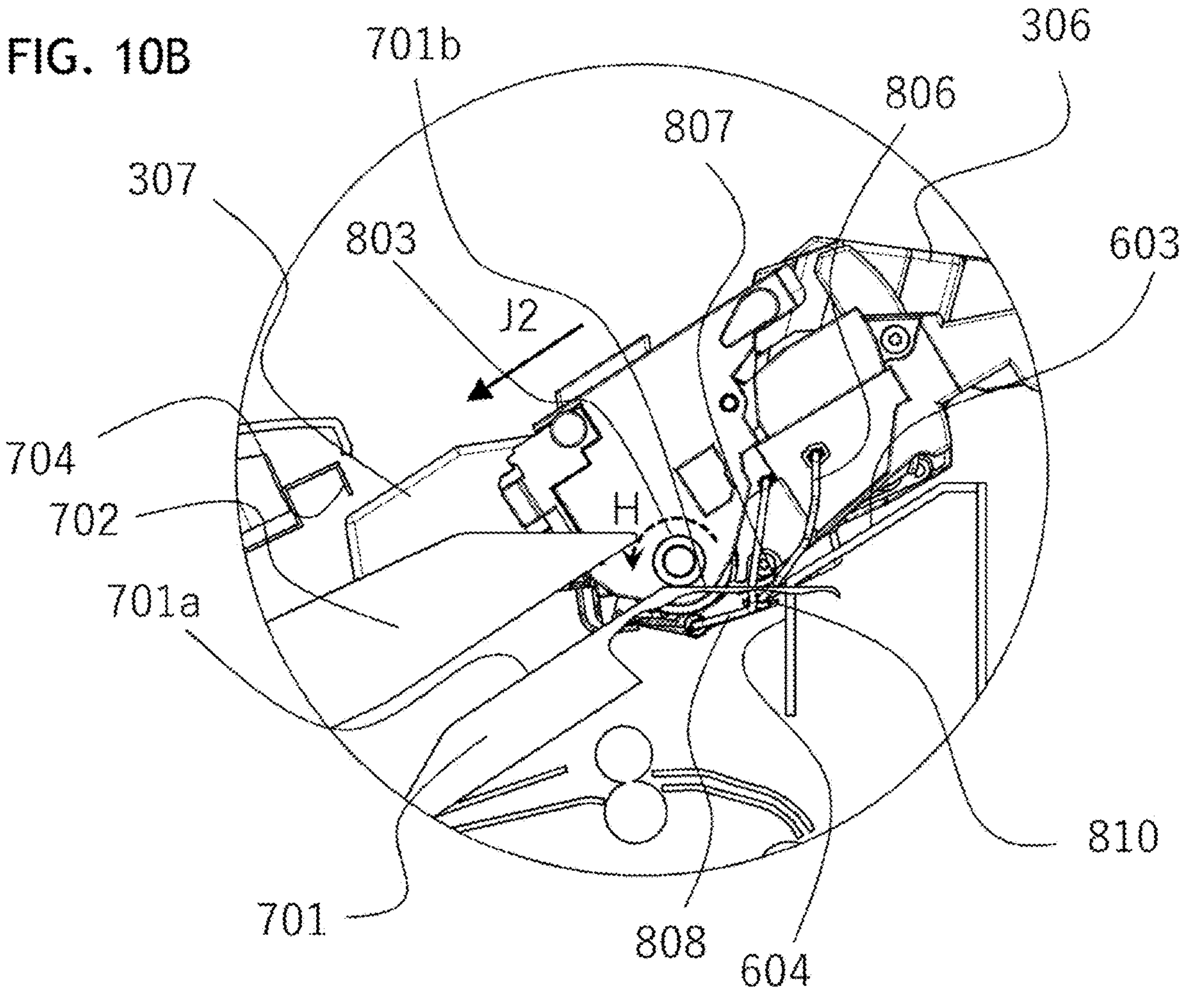

FIGS. 10A and 10B illustrate a state in which the insertion of the cartridge B has progressed, and the guided portion 803 is in contact with the contact portion 701*b* of the lower guide member 701. Moreover, at the same time, the contacted portion 807 is in contact with the contact portion 701*b*. It is to be noted that, in FIGS. 10A and 10B to FIGS. 14A and 14B, illustration of the opening/closing door 601 is omitted.

In FIGS. 10A and 10B, an attitude of the cartridge B is determined by contact of the guided portion 803 as well as the contacted portion 807 with the contact portion 701*b* at the same time. Moreover, at this time, the drum shutter 801 is still in a state of being closed. Moreover, at this time, the stop portion 604 and the drum-shutter contact portion 810 are in a separated state. In this Embodiment, the state where the guided portion 803 and the contact portion 701*b* are in contact as the cartridge B in FIGS. 10A and 10B is called a first state. It is to be noted that, in the drawing, the shape of the lower guide member 701 is partially cut out for explanation for the stop portion 604. Hereinafter, explanation will be made by cutting out the shape of the lower guide member 701 as necessary.

An operator moves the cartridge B so as to press it in a direction of an arrow J2, that is, to the rear of the apparatus main body A from the state in FIGS. 10A and 10B. At this time, the insertion of the cartridge B is progressed, while the contact state of the guided portion 803 and the contacted portion 807 with the contact portion 701*b* is maintained.

Here, it is necessary to regulate the attitude of the cartridge B so that the waste-toner container 307 provided in the cartridge B does not contact a stay member 704 of the apparatus main body A during insertion. This is for preventing deterioration of operability or breakage caused by contact between the waste-toner container 307 and the stay member 704. Thus, when the cartridge B is to be further inserted, the attitude of the cartridge B needs to be changed from the state in FIGS. 10A and 10B to the attitude rotated in a counterclockwise direction (direction of an arrow H) with respect to the guided portion 803.

Figure 11A:
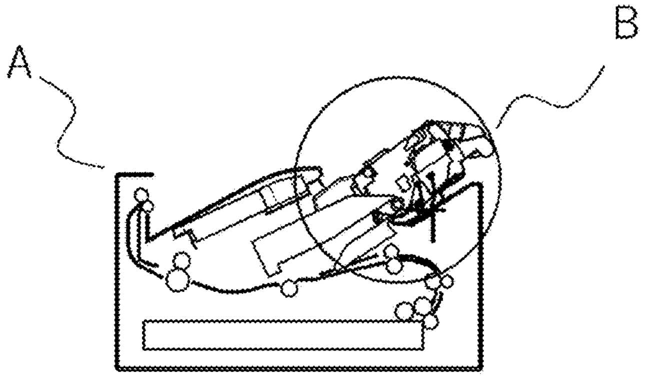
FIGS. 11A and 11B are diagrams subsequent to the diagram illustrating the state in the middle of the insertion of the cartridge B of the Embodiment 1.
Figure 11B:
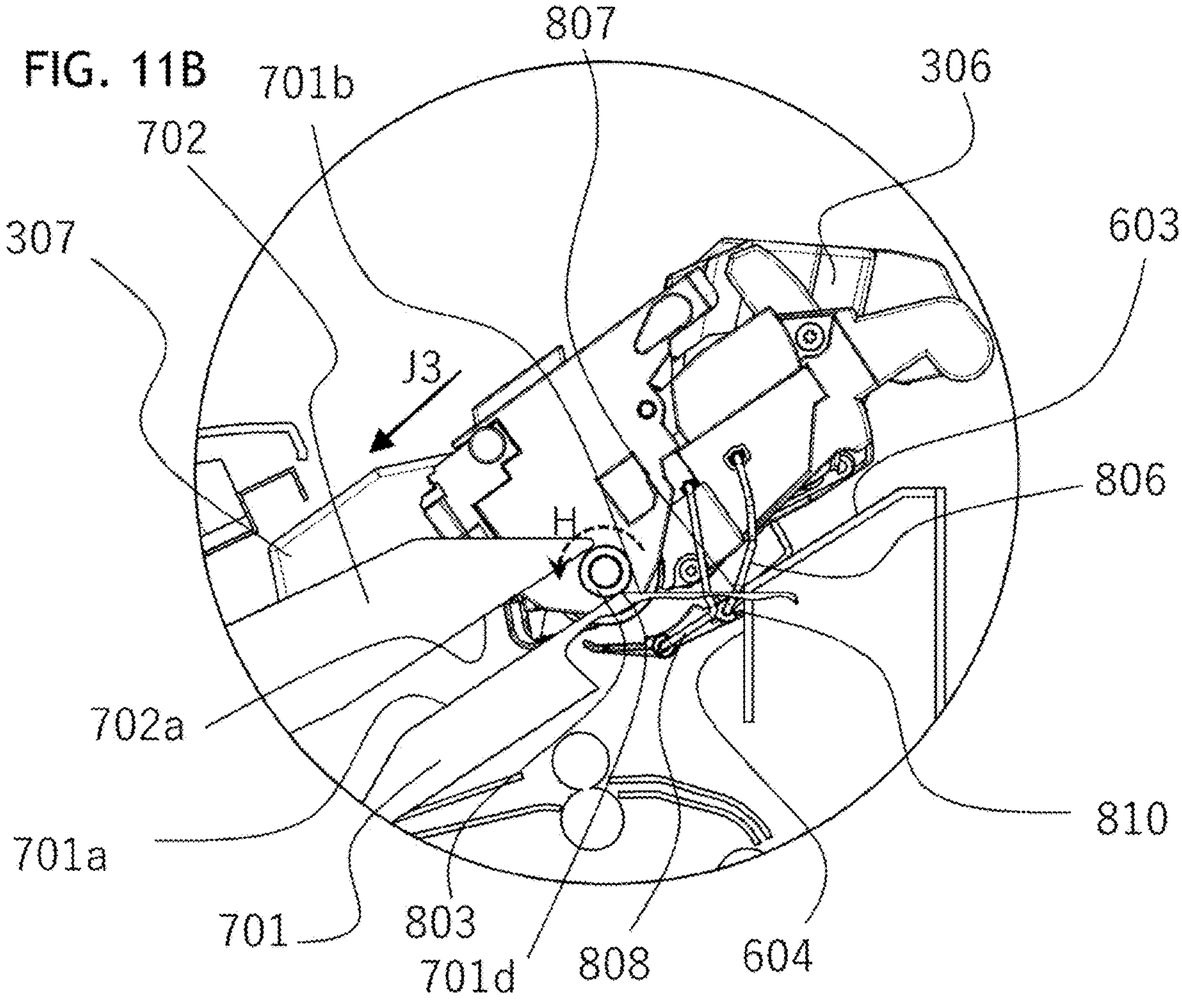

FIGS. 11A and 11B illustrate a state where the insertion of the cartridge B has further progressed from the state in FIGS. 10A and 10B. In FIGS. 10A and 10B, the guided portion 803 was in contact with the contact portion 701*b*. On the other hand, in FIGS. 11A and 11B, the guided portion 803 goes over a connection portion 701*d* where the contact portion 701*b* and the guide portion 701*a* are connected, and a gradient is switched, brining the guided portion 803 into contact with the guide portion 701*a*. That is, FIGS. 11A and 11B illustrate a state immediately after the switching of a contact target of the guided portion 803 from the contact portion 701*b* to the guide portion 701*a*. In this Embodiment, the state where the guided portion 803 is in contact with the guide portion 701*a* is called a second state. The cartridge B in FIGS. 11A and 11B can be considered to be immediately after the switching from the first state to the second state.

From the state in FIGS. 10A and 10B to the state in FIGS. 11A and 11B, the guided portion 803 is inserted into a space between the guide portion 701*a* and the regulating portion 702*a* of the upper guide member 702. It is to be noted that the guided portion 803 is so configured that it cannot be inserted into a place other than this. That is, the guided portion 803 is in such a state that only movement in the slope direction of the guide portion 701*a* and the rotating operation are unregulated.

Moreover, from the state in FIGS. 10A and 10B, the drum shutter 801 cannot rotate in the clockwise direction from the closed state. That is, the link member 806 coupled with the drum shutter 801 cannot rotate in the clockwise direction from the state where the drum shutter 801 is closed. Thus, in order to progress the insertion from the state in FIGS. 10A and 10B to the state in FIGS. 11A and 11B, the link member 806 needs to be rotated in the counterclockwise direction. It is to be noted that, terms “clockwise” and “counterclockwise” in this Description indicate rotating directions on the drawings.

Here, when the state in FIGS. 10A and 10B transfers to the state in FIGS. 11A and 11B, the guided portion 803 transfers to a state in contact with the guide portion 701*a*, and the contacted portion 807 to a state in contact with the contact portion 701*b*. As a result, the attitude of the cartridge B changes by rotating in the counterclockwise direction around the photosensitive-drum center shaft 802. With this attitude change of the cartridge B, the attitude of the link member 806 changes so as to rotate in the counterclockwise direction. That is, the attitude changes in a direction in which the drum shutter 801 is opened. Here, the drum shutter 801 has the drum-shutter contact portion 810, and the drum-shutter contact portion 810 and the stop portion 604 are brought into contact with each other. By means of this contact, the rotation in the clockwise direction of the link member 806 is regulated, and the change in the attitude of the cartridge B is regulated.

In this Embodiment, the link member 806 is coupled with the drum shutter 801. Thus, in FIGS. 10A and 10B and after, the drum shutter 801 moves so as to be opened with respect to the photosensitive drum 302 with the rotation of the link member 806. When the insertion of the cartridge B progresses from FIGS. 11A and 11B to the direction of an arrow J3, the state transfers to the one in FIGS. 12A and 12B.

Figure 12A:
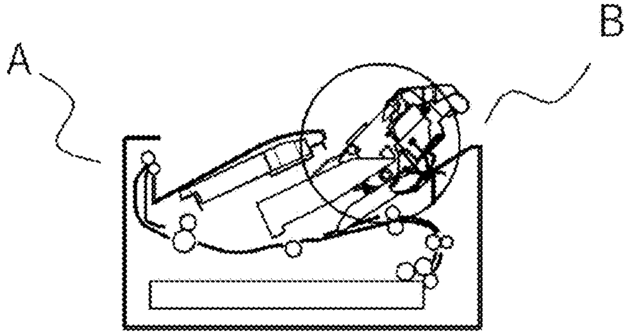
FIGS. 12A and 12B are diagrams subsequent to the diagram illustrating the state in the middle of the insertion of the cartridge B of the Embodiment 1.
Figure 12B:
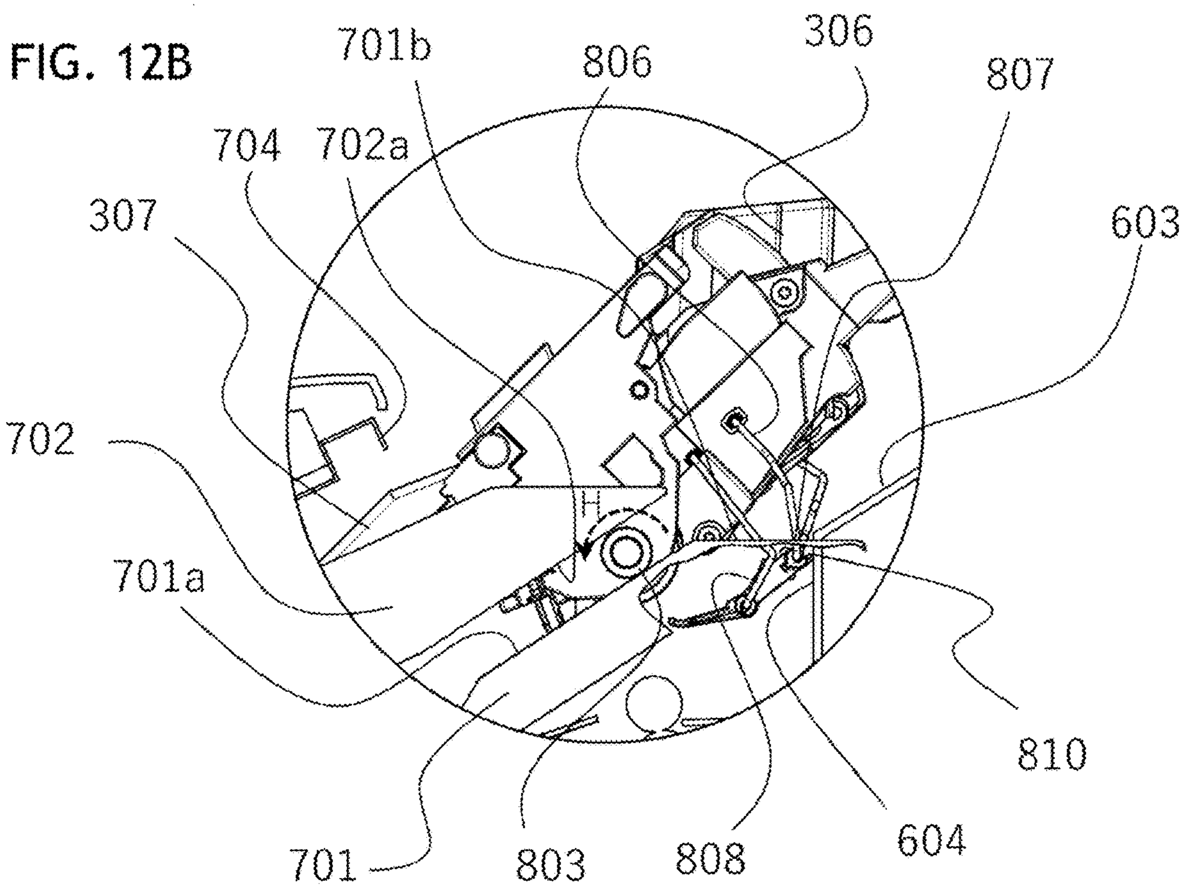

FIGS. 12A and 12B are a state in which the insertion has further progressed from the state in FIGS. 11A and 11B. In the drawings, too, the state is still the second state where the guided portion 803 is in contact with the guide portion 701*a*. Moreover, similarly to the state in FIGS. 11A and 11B, the contacted portion 807 and the contact portion 701*b*, and the stop portion 604 and the drum-shutter contact portion 810 still maintain the contact state. That is, from FIGS. 11A and 11B to FIGS. 12A and 12B, the cartridge B changes its attitude so as to further rotate in the counterclockwise direction with respect to the guided portion 803. At this time, the link member 806 is further rotated around the vicinity of a part where the contacted portion 807 and the contact portion 701*b* are in contact. The change in the attitude of the cartridge B in the counterclockwise direction (arrow H direction) with respect to the guided portion 803 from FIGS. 11A and 11B to FIGS. 12A and 12B is a direction in which the toner container 306 is lifted, and on the waste-toner container 307 side, the attitude is further changed in the lowering direction. As a result, contact between the stay member 704 and the waste-toner container 307 is avoided. In this Embodiment, in the second state where the guided portion 803 and the guide portion 701*a* are in contact as above, the attitude of the cartridge B is gradually changed by the link member 806 and thus, the cartridge B can be inserted while an insertion path is regulated in order to avoid contact.

Figure 13A:
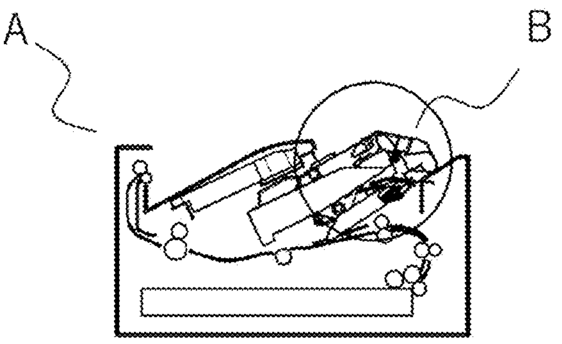
FIGS. 13A and 13B are diagrams subsequent to the diagram illustrating the state in the middle of the insertion of the cartridge B of the Embodiment 1.
Figure 13B:
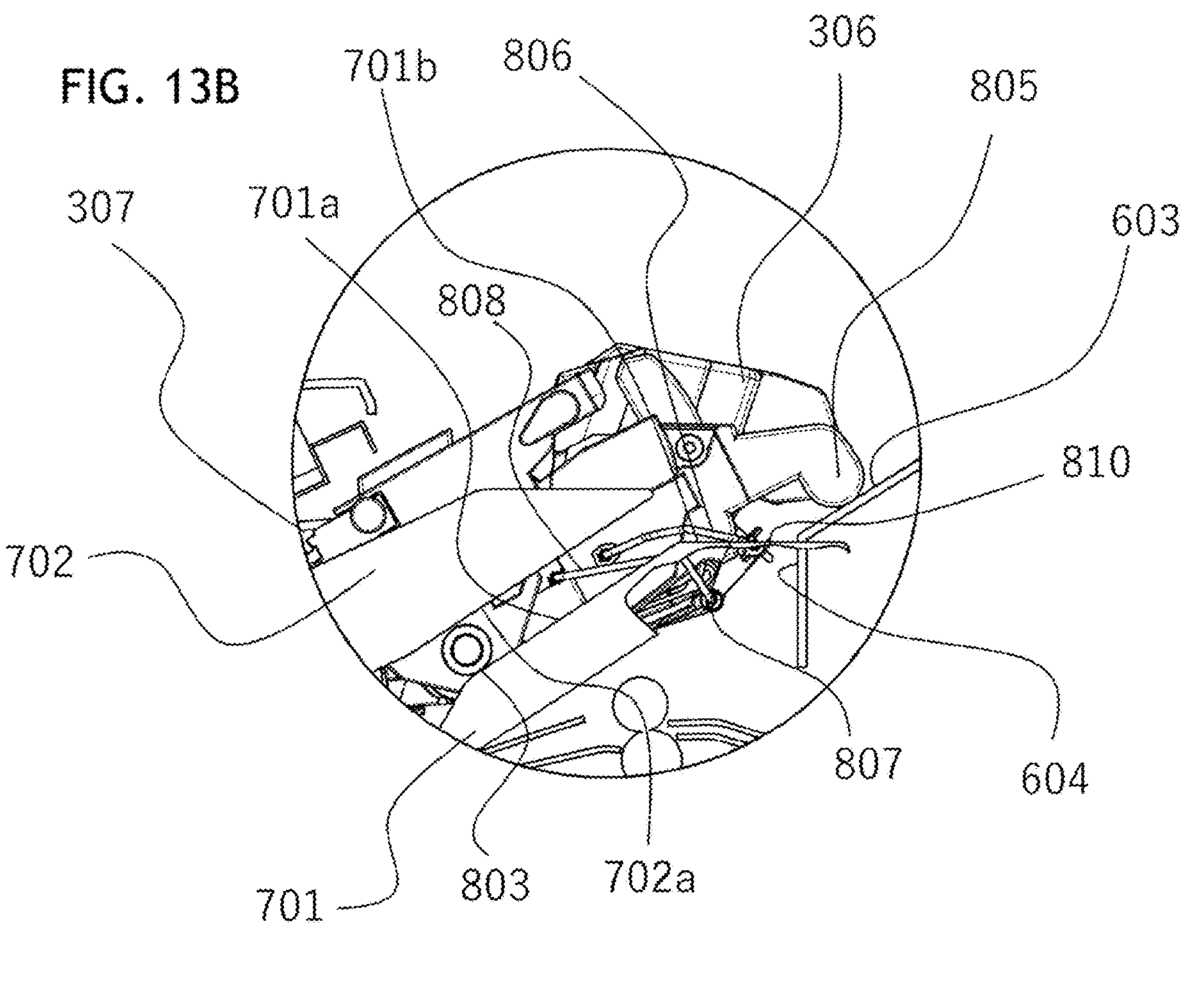

FIGS. 13A and 13B are a state where the insertion has further progressed from the state in FIGS. 12A and 12B. The guided portion 803 is brought into contact with the guide portion 701*a* and is located between the guide portion 701*a* and the regulating portion 702*a*. Moreover, though the contacted portion 807 is in contact with the contact portion 701*b*, the drum-shutter contact portion 810 and the stop portion 604 are not in contact.

That is, in the state where the insertion has progressed as in FIGS. 13A and 13B, the link member 806 does not regulate the attitude of the cartridge B. In the state in FIGS. 13A and 13B, a provisional rotation-retaining portion 805 provided in the cartridge B is brought into contact with the cover portion 603, whereby the attitude of the cartridge B is regulated.

Figure 14A:
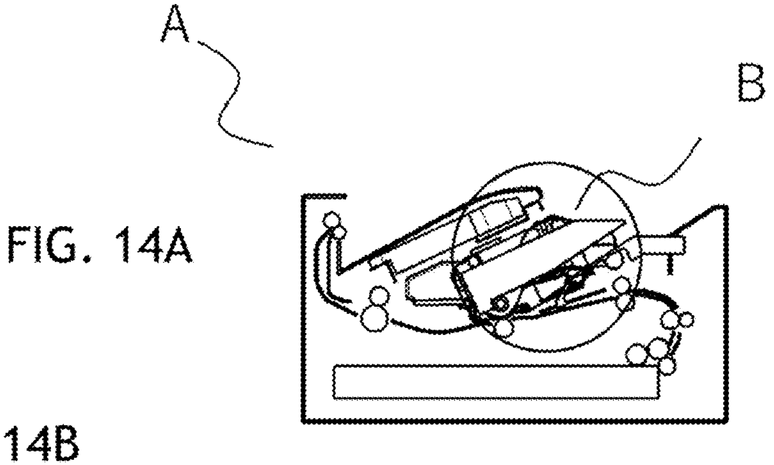
FIGS. 14A and 14B are diagrams illustrating a state where the cartridge B of the Embodiment 1 is completely attached.
Figure 14B:
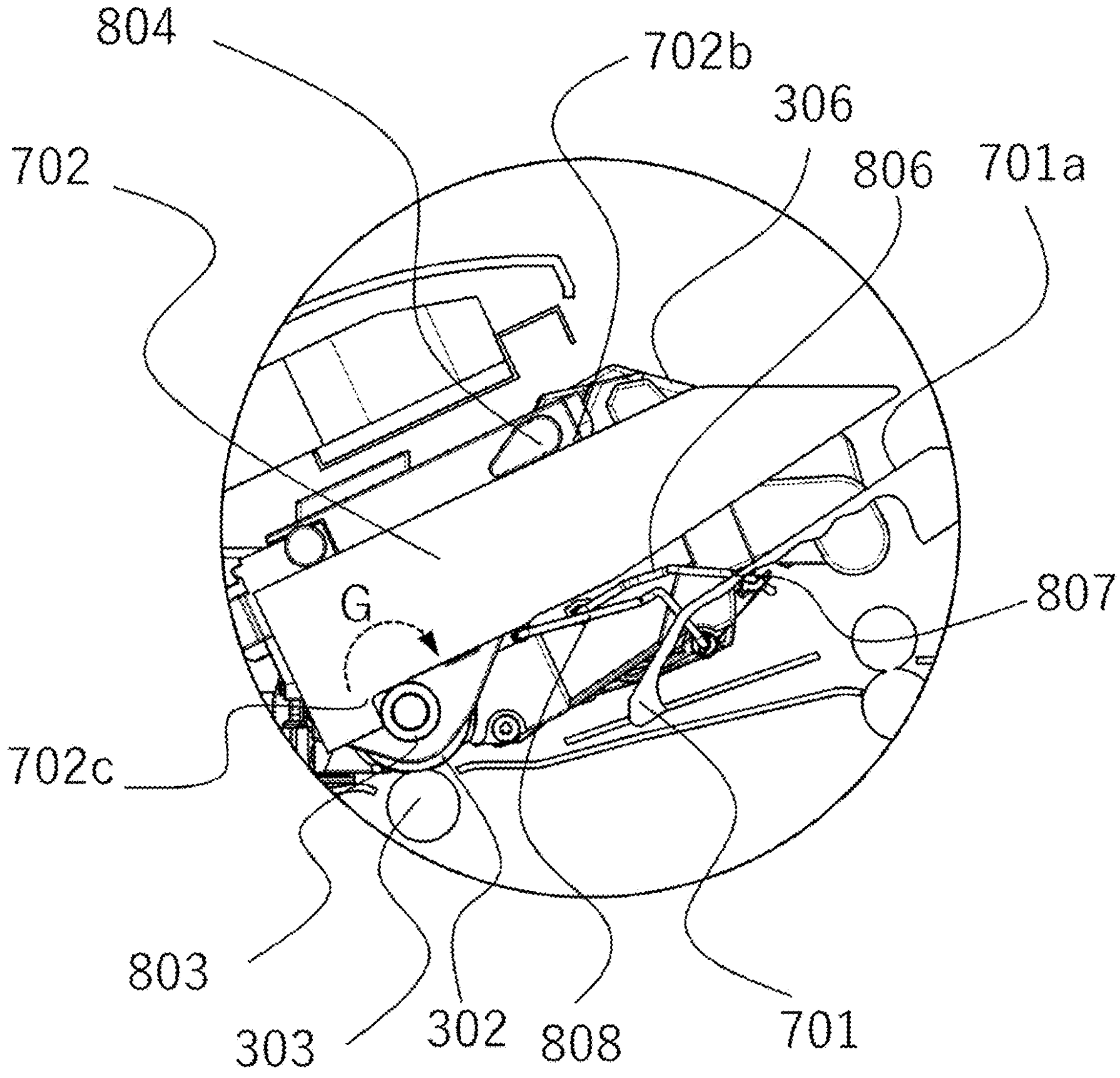

FIGS. 14A and 14B are a state where the insertion has further progressed from the state in FIGS. 13A and 13B, the attachment is completed, and the cartridge B is at an attachment completed position. This state shall be referred to a third state of the cartridge B in this Embodiment. On the upper part of the lower guide member 701, the upper guide member 702 is fixed to the apparatus main body A. The upper guide member 702 has an attachment-time regulating portion 702*c* to contact the guided portion 803 in the attachment completed state. The transfer roller 303 in this Embodiment is urged to an upper side by an urging member, not shown. As a result, the transfer roller 303 pushes the photosensitive drum 302 to the upper side, and the guided portion 803 is brought into contact with the upper side from the lower side with respect to the attachment-time regulating portion 702*c*.

The cartridge B in this Embodiment has the rotation retaining portion 804 disposed on the toner container 306 side with respect to the rotation shaft of the photosensitive drum 302. Moreover, the cartridge B is designed so as to generate a moment in a clockwise direction (arrow G direction) in FIGS. 14A and 14B around the rotation shaft of the photosensitive drum 302 by weights of the toner container 306 and the waste toner container. As a result, in the state in FIGS. 14A and 14B, the rotation retaining portion 804 is in contact with the rotation-retaining contact portion 702*b* all the time.

In the state where the cartridge B is completely inserted as above, the attitude is regulated by the contact of the attachment-time regulating portion 702*c* with the guided portion 803 and the contact of the rotation-retaining contact portion 702*b* with the rotation retaining portion 804.

At this time, the contacted portion 807 of the link member 806 is in a state of being placed on the guide portion 701*a* of the lower guide member 701 and does not influence the attitude of the cartridge B.

As illustrated as above, even in the vicinity of the opening 602 in the beginning of the insertion of the cartridge B, the attitude, the insertion/removal trajectory of the cartridge B are regulated by a relation among the contacted portion 807 of the link member 806, the guide portion 701*a*, and the stop portion 604.

As described above, due to the recent demand for size reduction of an image forming apparatus, the opening also tends to be narrower. As an example, in the image forming apparatus in this Embodiment, there arises a need for the attitude of the cartridge B during insertion or removal to be changed from the opening provided on the upper front side of the apparatus main body A. As a result, the possibility of contact occurring during insertion or removal tends to be high. According to this Embodiment, even in a case of insertion or removal accompanied by an attitude change, contact between the cartridge B (the waste-toner container 307 in this Embodiment) and the apparatus main body A (the stay member 704 in this Embodiment) can be avoided.

Moreover, even if the attitude or the insertion/removal trajectory of the cartridge B needs to be changed in the middle of the insertion to a greater extent than that illustrated in this Embodiment, it can be an be readily accommodated by adjusting the relationship among the guide portion 701*a*, the contact portion 701*b*, the stop portion 604 of the apparatus main body A, and the contacted portion 807 B, the drum-shutter contact portion 810 of the cartridge B.

As described above, the insertion of the cartridge B has been specifically explained. When the cartridge B is to be removed, it is removed by going through the states opposite to those in the explanation so far. That is, also during removal, contact between the cartridge B (waste-toner container 307) and the apparatus main body A (stay member 704) in the vicinity of the opening can be avoided by means of the operation of the link member 806.

In this Embodiment, in the vicinity of the opening 602, the guided portion 803 is regulated between the guide portion 701*a* and the regulating portions 702*a*. For example, if the weight of the cartridge B is sufficiently large, and the guided portion 803 and the guide portion 701*a* are brought into contact with each other only by the gravity force, there is no need for regulation between the guide portion 701*a* and the regulating portion 702*a*. Thus, when the weight of the cartridge B is sufficiently large, the upper guide member 702 can be made shorter and smaller.

Embodiment 2

A Second Embodiment according to this case will be explained. It is to be noted that the overall configuration of the image forming apparatus 100 and the process of the image forming operation are similar to those in the Embodiment 1 and thus, the explanation will be omitted. Moreover, for the same components as those in the Embodiment 1, the same signs will be used.

In the Embodiment 1, the drum shutter 801 and the link member 806 are coupled, but in this case, the size and the operation of the link member 806 are restricted. Here, in a state where the cartridge B is completely attached in the apparatus main body A, and the drum shutter 801 is open, a space in which the drum shutter 801 is accommodated is needed on the lower side of the toner container 306. This accommodating space is indicated as a broken-line region M in FIG. 7C. However, if there is no drum shutter 801, this accommodating space is no longer needed and thus, a capacity of the cartridge B can be increased. Thus, in this Embodiment, in order to protect the surface of the photosensitive drum 302, a detachable-type drum cover 901 is used.

Figure 15:
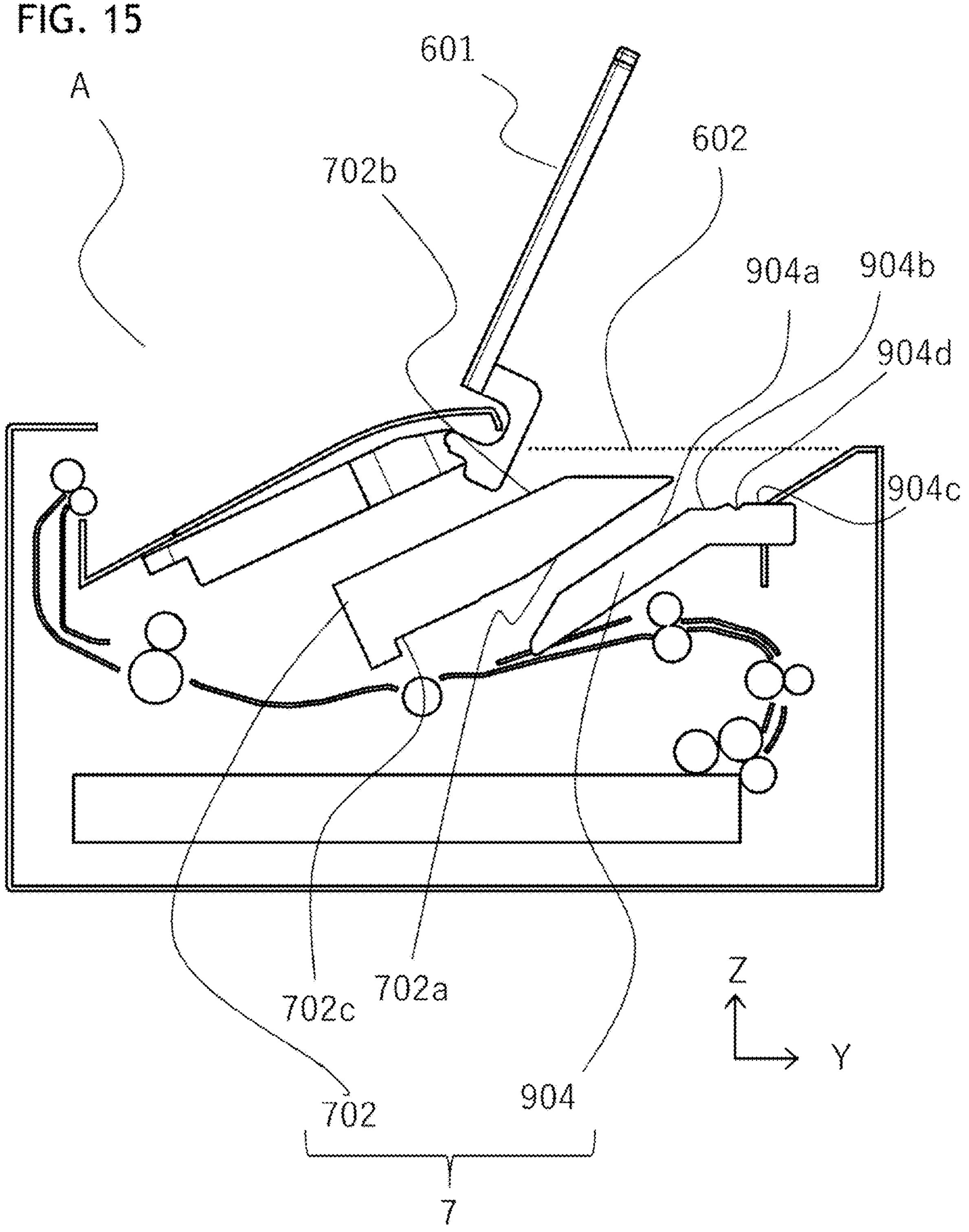
FIG. 15 is an explanatory diagram of a guide portion of an Embodiment 2.

FIG. 15 illustrates a guide member shown in this Embodiment. The guide portion 7 in this Embodiment includes a lower guide member 904 and the upper guide member 702 similar to the Embodiment 1. It is to be noted that this Embodiment is similar to the Embodiment 1 other than the lower guide member 904 and thus, the explanation will be omitted.

The lower guide member 904 has a guide portion 904*a* for guiding the cartridge B. Moreover, the guide portion 904*a* is formed on the slope with an angle with respect to the horizontal below the opening 602 in the apparatus main body A at a position hidden by the opening/closing door 601 when the opening/closing door 601 is closed. Moreover, the lower guide member 904 has a first contact portion 904*b* continuing to the guide portion 904*a*. Moreover, the lower guide member 904 has a V-shaped stop portion 904*d* formed having a protruding shape continuing to the first contact portion 904*b*. Furthermore, it has a second contact portion 904*c* formed by continuing to the stop portion 904*d*. In this Embodiment, the first contact portion 904*b* and the second contact portion 904*c* are horizontal, but they may be planes with an angle with respect to the horizontal depending on the form.

Figure 16:
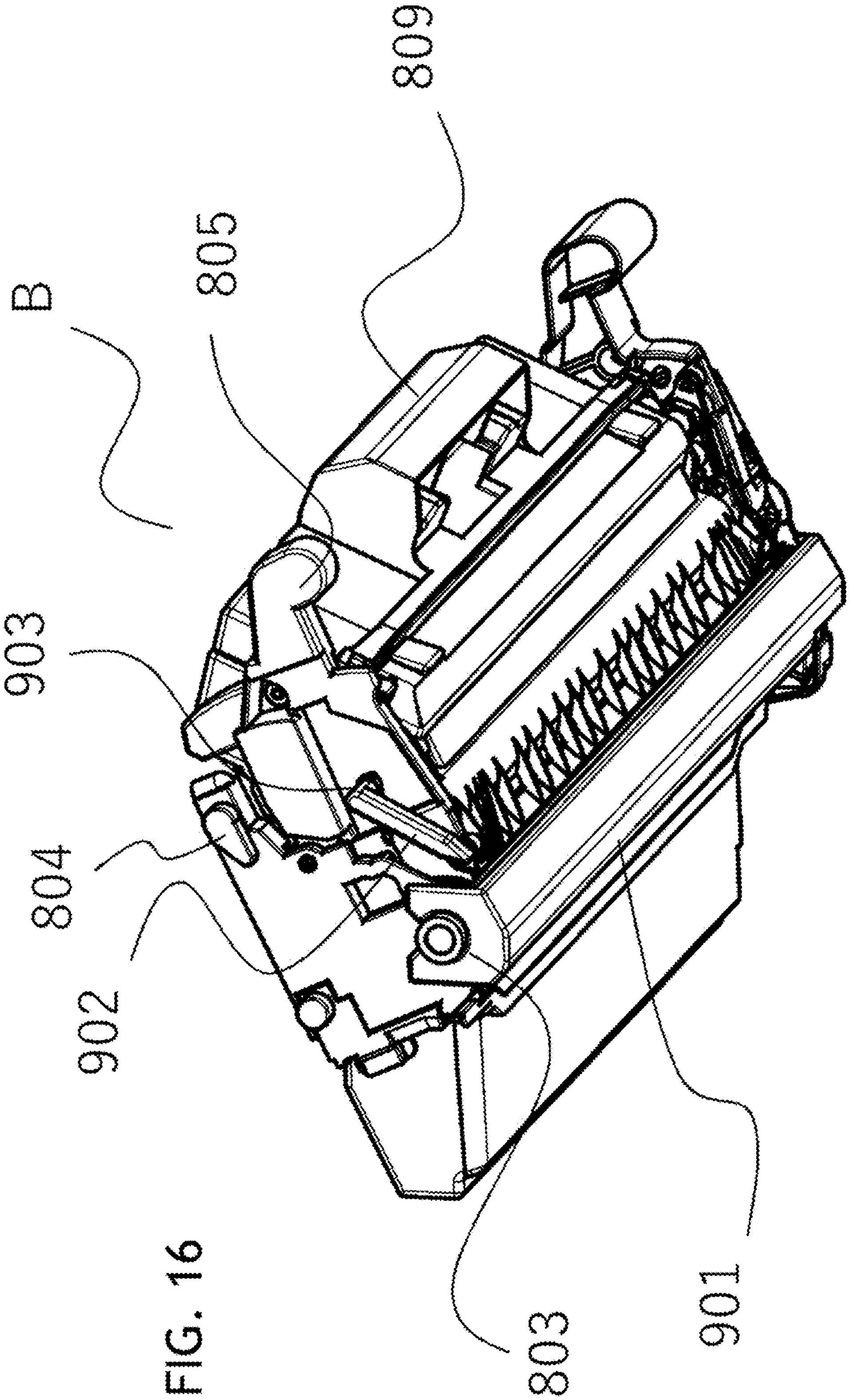
FIG. 16 is a perspective view of a state where a cover of the cartridge B of the Embodiment 2 is attached.
Figure 17:
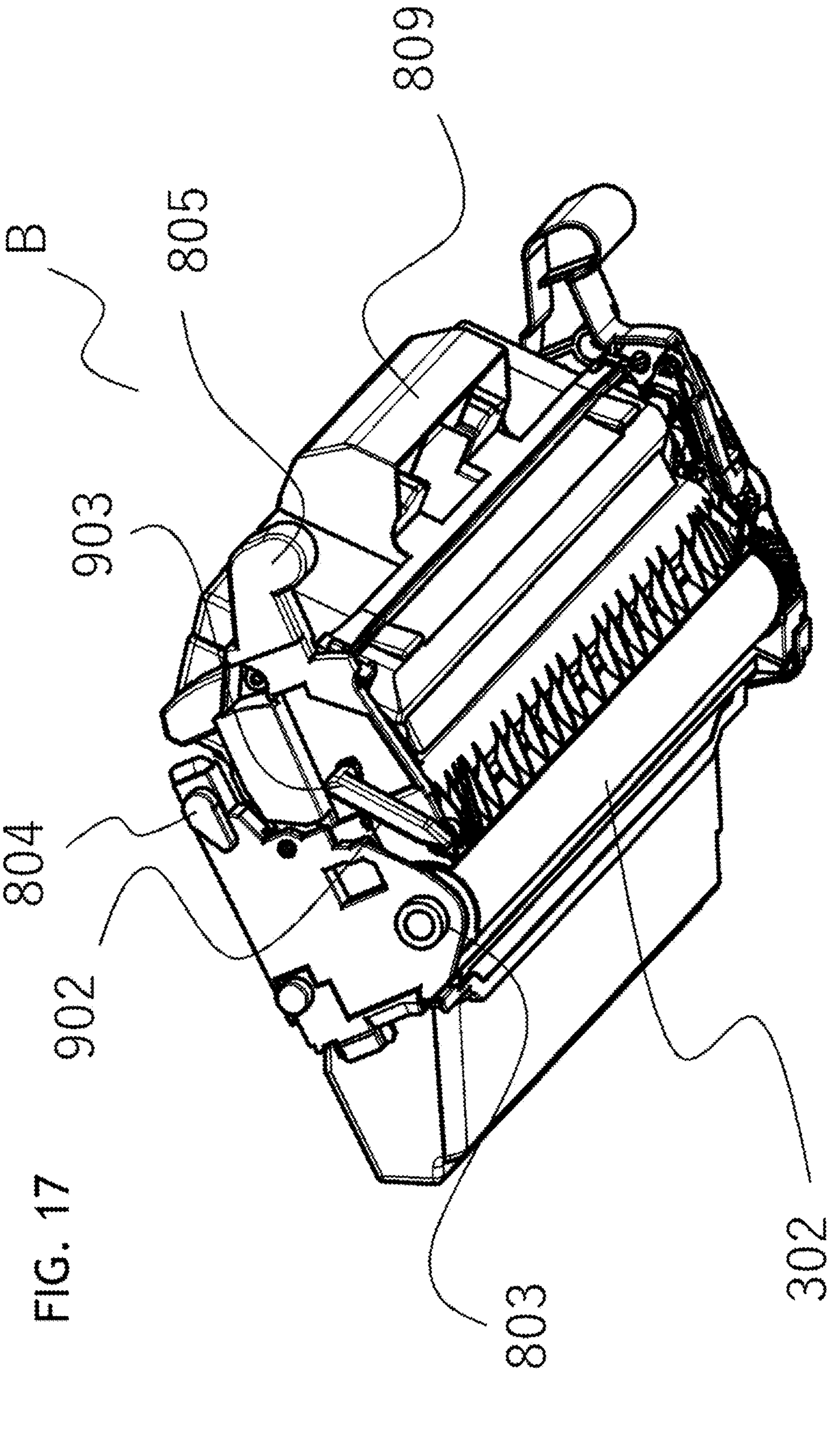
FIG. 17 is a perspective view of a state where the cover of the cartridge B of the Embodiment 2 is removed.
Figure 18:
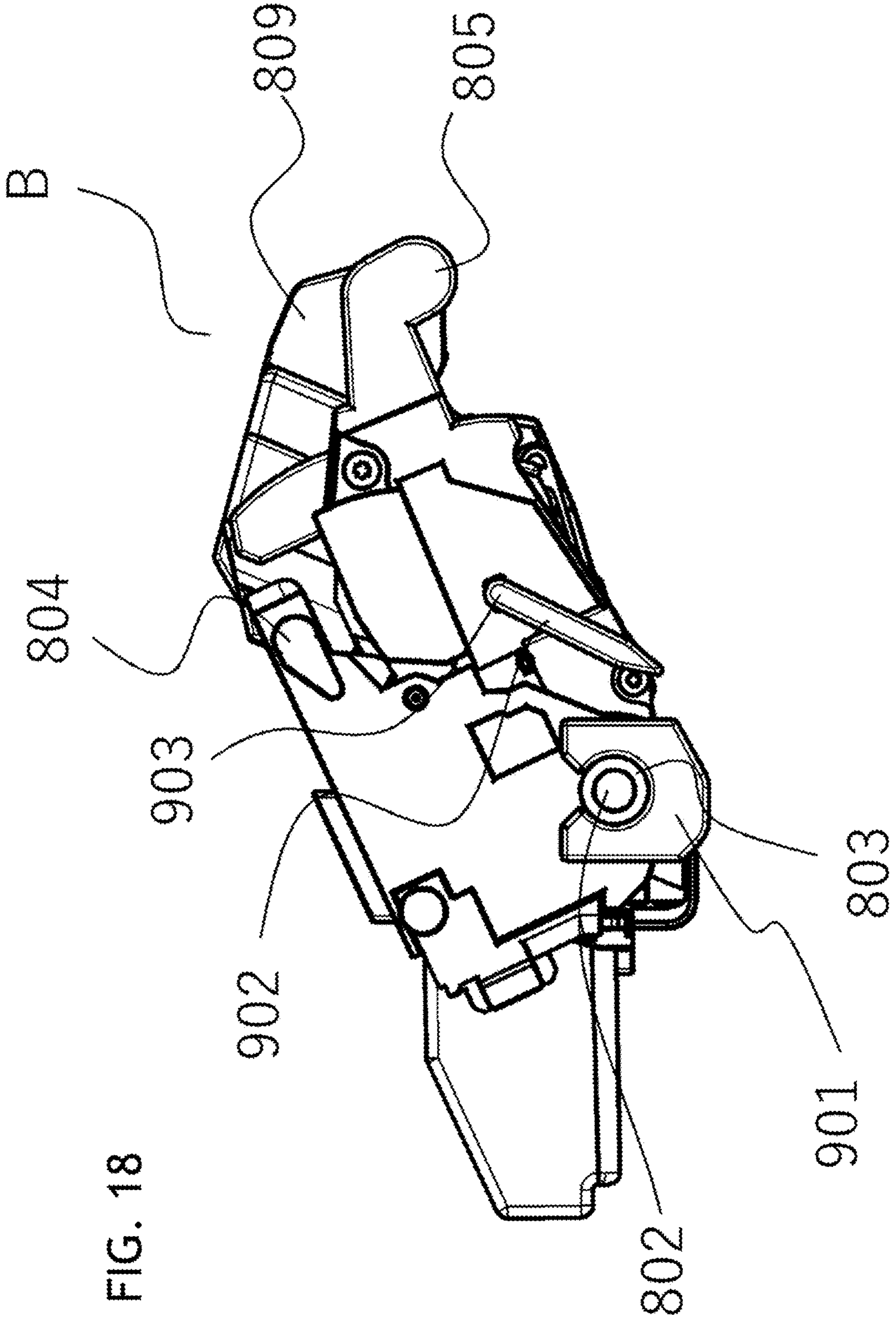
FIG. 18 is a side view of a state where the cover of the cartridge B of the Embodiment 2 is attached.
Figure 19:
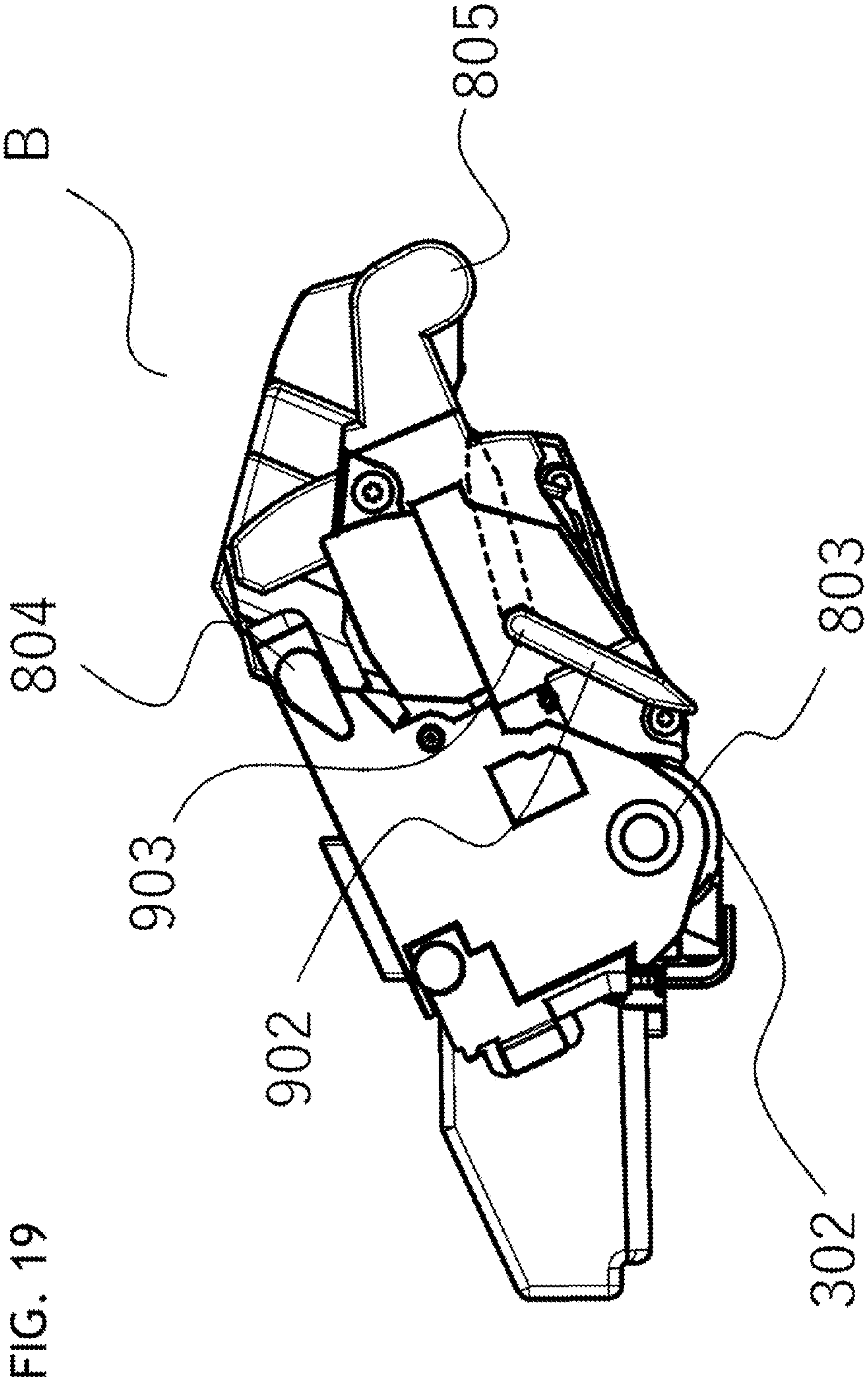
FIG. 19 is a sideview of a state where the cover of the cartridge B of the Embodiment 2 is removed.

With reference to FIG. 16 to FIG. 19, the cartridge B of this Embodiment will be explained. The cartridge B in this Embodiment includes the detachable-type drum cover 901 for protecting the surface of the photosensitive drum 302 in a state of being placed outside the apparatus main body A. FIG. 16 is a perspective view of the cartridge B when viewed from the lower left side of the apparatus main body A in the state where the drum cover 901 is attached to the cartridge B, and the photosensitive drum 302 is protected. FIG. 17 is a perspective view of the cartridge B when viewed from the lower left side of the apparatus main body A in a state where the drum cover 901 is removed from the cartridge B, and the image formation can be performed. FIG. 18 and FIG. 19 illustrate side views of the cartridge B when viewed from the left direction of the main body. FIG. 18 illustrates the drum cover 901 when attached, and FIG. 19 illustrates the drum cover 901 when removed.

FIG. 16 illustrates a state where the drum cover 901 is attached, that is, a state where the cartridge B is outside the apparatus main body A. FIG. 17 illustrates a state where the drum cover 901 was removed, that is, a state where the cartridge B is attached to the apparatus main body A. Similarly, FIG. 18 illustrates a state where the drum cover 901 is attached, and FIG. 19 for a state where the drum cover 901 is removed.

The link member 902 in this Embodiment is capable of rotational movement around a link-member rotation center 903 with respect to the cartridge B. The link member 902 has the link-member rotation center 903 closer to the upstream side than the photosensitive drum 302 with respect to the insertion direction of the cartridge B and is urged by urging means, not shown, in a direction approaching the photosensitive drum 302. The link member 902 is configured not to rotate further in a clockwise direction from the position in FIG. 19. Moreover, a broken line shown in FIG. 19 indicates a position where the link member 902 has rotated to the maximum in a counterclockwise direction with respect to the link-member rotation center 903. It is to be noted that, in this Embodiment, the link member 902 has a shape with a sharpened end part on a side opposite to the link-member rotation center 903.

Moreover, similarly to the Embodiment 1, the cartridge B has the handle portion 809 in a front-side direction of the apparatus main body A with respect to the photosensitive drum 302. When the cartridge B is to be inserted/removed, the user holds the handle portion 809, but if it is not lifted up intentionally, the guided portion 803 is inserted/removed by the gravity force while in contact with the first contact portion 904*b*, the guide portion 904*a*. In this Embodiment, the insertion/removal in this state will be explained.

Figure 20A:
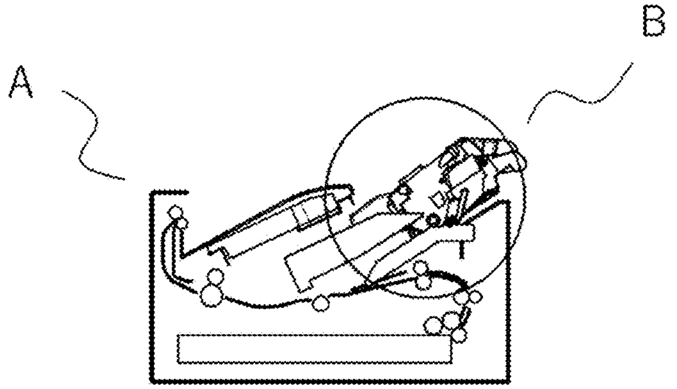
FIGS. 20A and 20B are diagrams illustrating a state in the middle of the insertion of the cartridge B of the Embodiment 2.
Figure 20B:
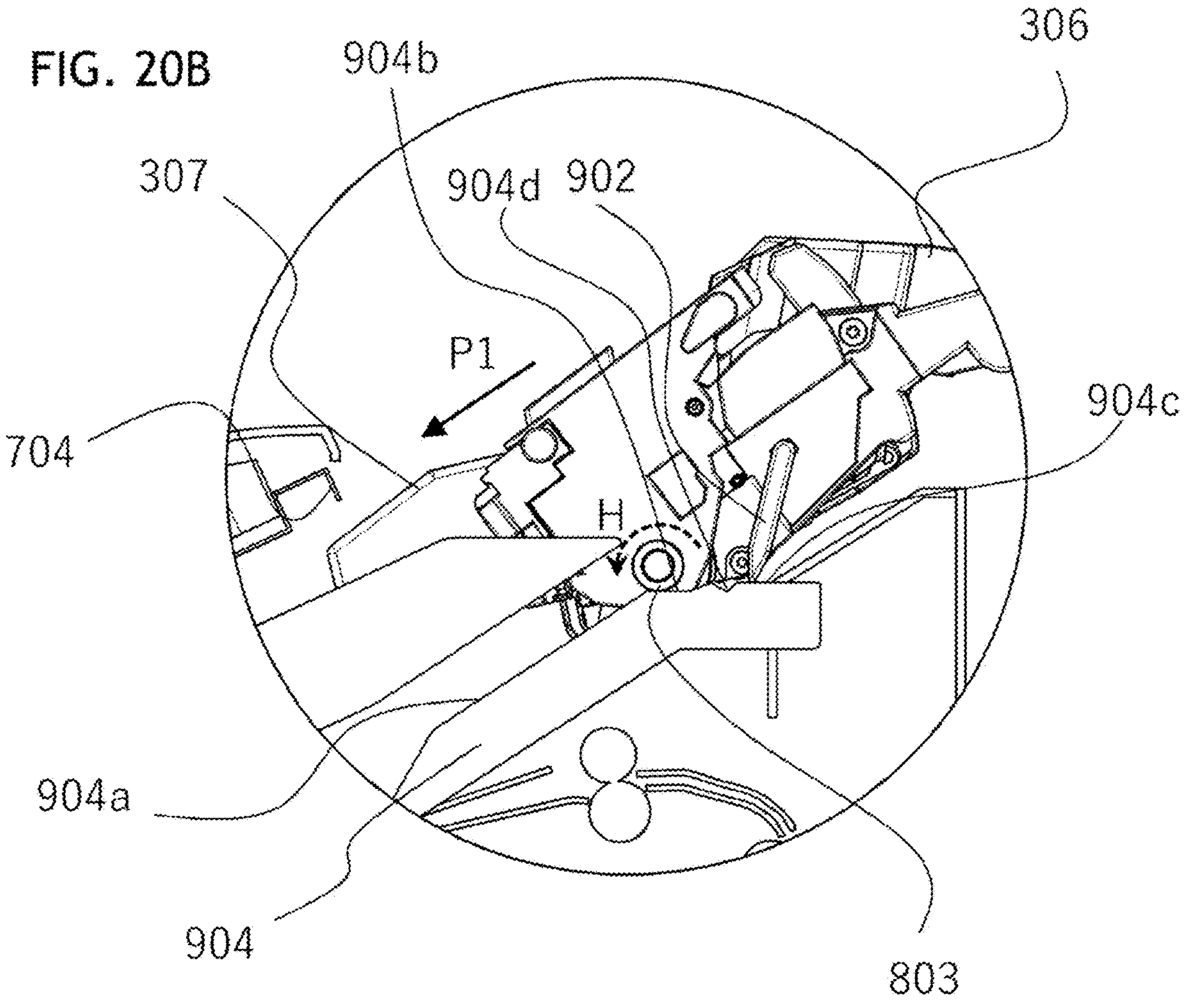

Insertion of Cartridge FIGS. 20A and 20B illustrates a state where the guided portion 803 is brought into contact with the first contact portion 904*b* of the lower guide member 904 when the cartridge B is inserted. Moreover, at the same time, a distal end of the link member 902 is in contact with the second contact portion 904*c*. By means of the two contacting, the attitude of the cartridge B is determined. It is to be noted that the opening/closing door 601 is not shown in FIGS. 20A and 20B and after.

The operator moves the cartridge B as it is pressed toward the rear side of the apparatus main body A from the state in FIGS. 20A and 20B (arrow P1 direction). That is, the insertion of the cartridge B is progressed, while contact states of the guided portion 803 with the first contact portion 904*b* and of the link member 902 with the second contact portion 904*c* are maintained. In this Embodiment, the state where the guided portion 803 is brought into contact with the first contact portion 904*b* is referred to as the first state of the cartridge B.

Here, the attitude of the cartridge B needs to be regulated so that the waste-toner container 307 is not brought into contact with the stay member 704 in the middle of the insertion. This is to prevent deterioration in the operability or breakage caused by contact between the toner container 307 and the stay member 704. Thus, the cartridge B needs to have the attitude rotated in the counterclockwise direction (arrow H direction) with respect to the guided portion 803.

Figure 21A:
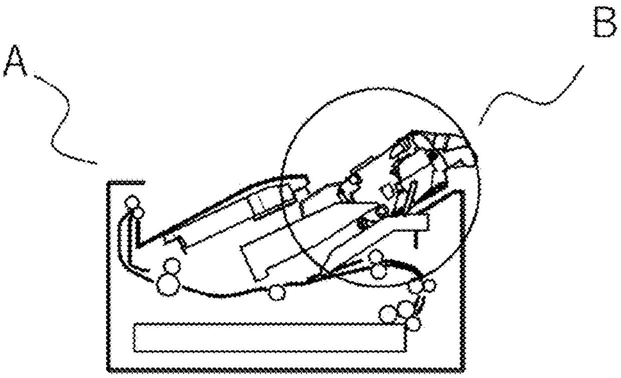
FIGS. 21A and 21B are diagrams subsequent to the diagram illustrating the state in the middle of the insertion of the cartridge B of the Embodiment 2.
Figure 21B:
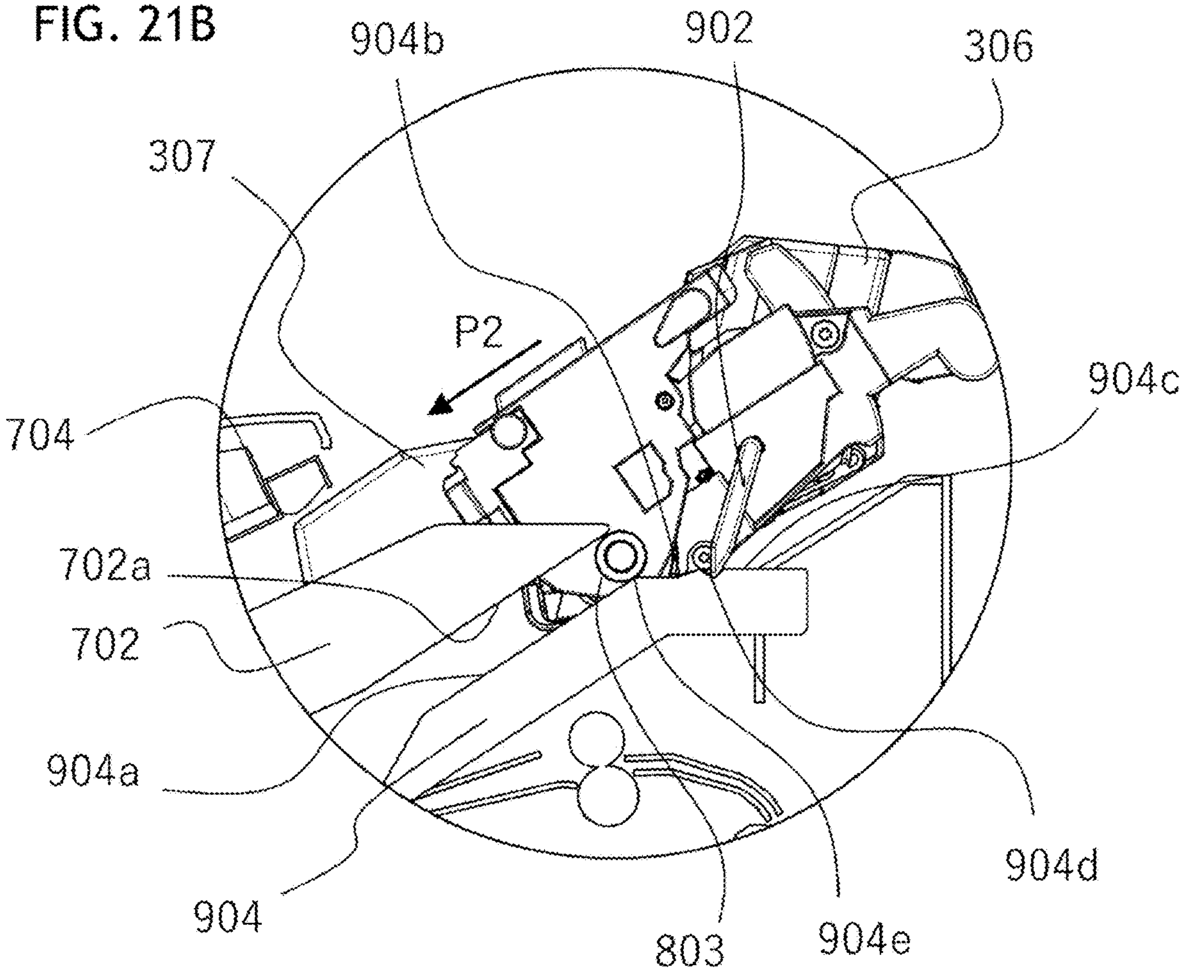

FIGS. 21A and 21B illustrate a state where the insertion of the cartridge B has further progressed from the state in FIGS. 20A and 20B. In FIGS. 20A and 20B, the guided portion 803 is in contact with the first contact portion 904*b*. On the other hand, in FIGS. 21A and 21B, the guided portion 803 goes over a connecting portion 904*e*, where the first contact portion 904*b* and the guide portion 904*a* are connected, and the gradient is switched, and is brought into contact with the guide portion 904*a*. FIGS. 21A and 21B illustrate a state immediately after a contact target of the guided portion 803 is switched from the first contact portion 904*b* to the guide portion 904*a*. In this Embodiment, the state where the guided portion 803 is in contact with the guide portion 904*a* is referred to as the second state, and the FIGS. 21A and 21B illustrate the state immediately after the first state is switched to the second state.

From the state in FIGS. 20A and 20B to the state in FIGS. 21A and 21B, the guided portion 803 is inserted into a space between the guide portion 904*a* and the regulating portion 702*a* of the upper guide member 702 similar to the Embodiment 1. It is to be noted that the guided portion 803 is configured incapable of being inserted into places other than the above. That is, the guided portion 803 is in a state where only movement in a slope direction of the guide portion 904*a* and the rotating operation are not regulated.

Moreover, at this time, the distal end of the link member 902 is in contact with a bottom of the V-shaped stop portion 904*d*. Here, the link member 902 is configured incapable of being further rotated in the clockwise direction around the link-member rotation center 903 from this state. Thus, in order to progress the insertion of the cartridge B from the state in FIGS. 21A and 21B, the link member 902 needs to be rotated in the counterclockwise direction. That is, in the state in FIGS. 21A and 21B and after, the link member 902 performs the rotating operation while changing the attitude of the cartridge B while the distal end thereof being in contact with the bottom of the stop portion 904*d*. It is to be noted that the shape of the distal end of the link member 902 and the shape of the stop portion 904*d* are not limited to a combination of the sharpened distal end and the V-shaped groove as shown. It may be any combination as long as it allows the rotating operation while the movement is regulated by joint between the distal end of the link member 902 and the stop portion 904*d*.

Figure 22A:
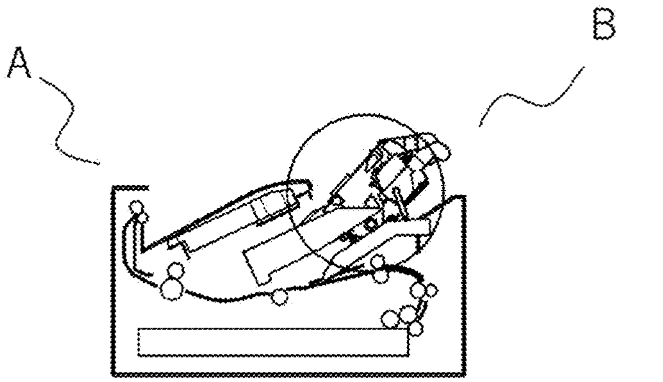
FIGS. 22A and 22B are diagrams subsequent to the diagram illustrating the state in the middle of the insertion of the cartridge B of the Embodiment 2.
Figure 22B:
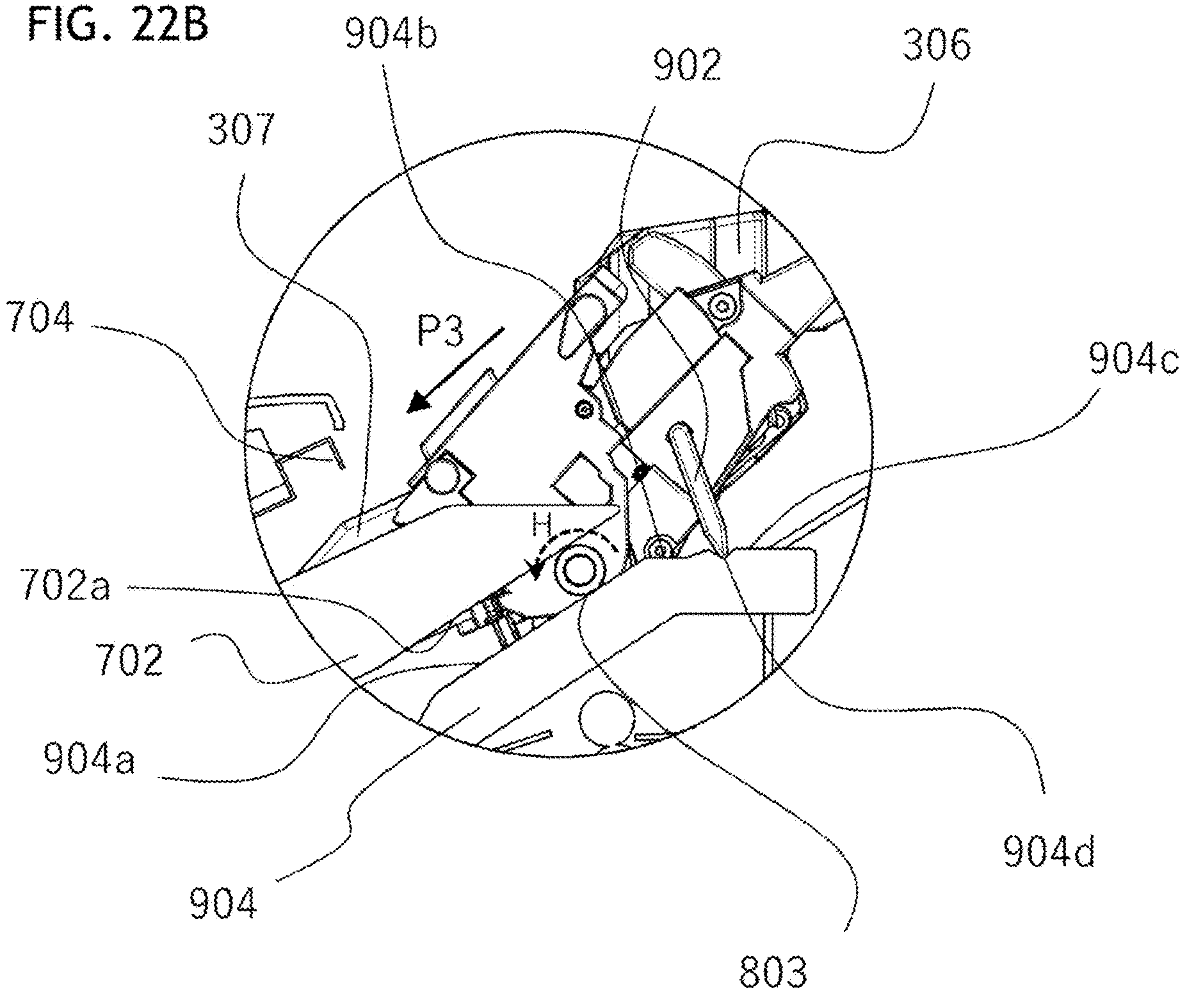

FIGS. 22A and 22B are a state in which the insertion has further progressed in a direction of an arrow P2 from the state in FIGS. 21A and 21B. Similarly to the state in FIGS. 21A and 21B, the distal end of the link member 902 is in contact with the bottom of the stop portion 904*d*, and the guided portion 803 is in contact with the guide portion 904*a*.

That is, from FIGS. 21A and 21B to FIGS. 22A and 22B, the cartridge B changes its attitude so as to further rotate in the counterclockwise direction (arrow H direction) with respect to the guided portion 803. That is, in a state where the link member 902 is in contact with the bottom of the stop portion 904*d*, since the stop portion 904*d* is V-shaped, the link member 902 is allowed only for the rotating operation around the bottom of the stop portion 904*d*. Therefore, by means of the rotating operation of the link member 902, the attitude of the cartridge B is changed in the direction in which the toner container 306 is lifted. This is the direction of lowering with respect to the waste-toner container 307 located on the side opposite to the guided portion 803. In this Embodiment, in the second state where the guided portion 803 and the guide portion 904*a* are in contact as above, the attitude of the cartridge B is gradually changed by the link member 902. As a result, the contact between the stay member 704 and the waste-toner container 307 can be avoided.

Figure 23A:
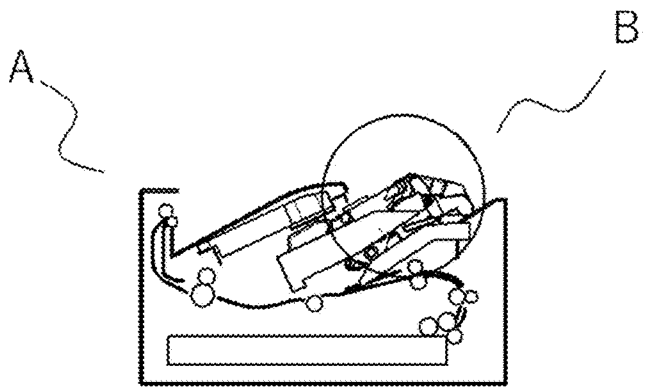
FIGS. 23A and 23B are diagrams subsequent to the diagram illustrating the state in the middle of the insertion of the cartridge B of the Embodiment 2.
Figure 23B:
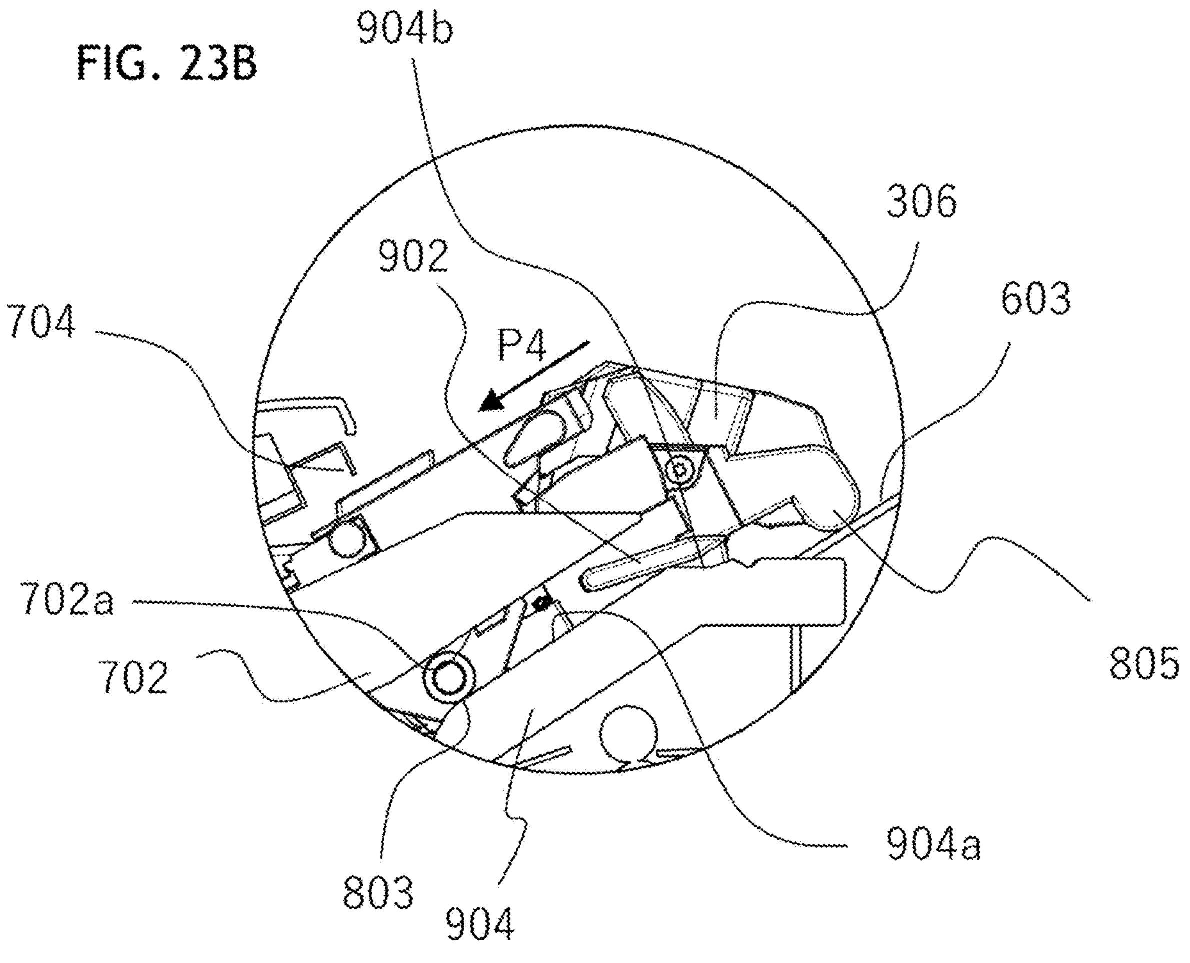

FIGS. 23A and 23B are a state where the insertion has further progressed in a direction of an arrow P3 from the state in FIGS. 22A and 22B. With the progress of the cartridge B, the link member 902 is separated from the stop portion 904*d*. In this state, the link member 902 is only placed on the lower guide member 904 and does not regulate the attitude of the cartridge B. In the state where the insertion has progressed as in FIGS. 23A and 23B, the attitude of the cartridge B is temporarily determined by contact of the provisional rotation-retaining portion 805 provided in the cartridge B with the cover portion 603.

Figure 24A:
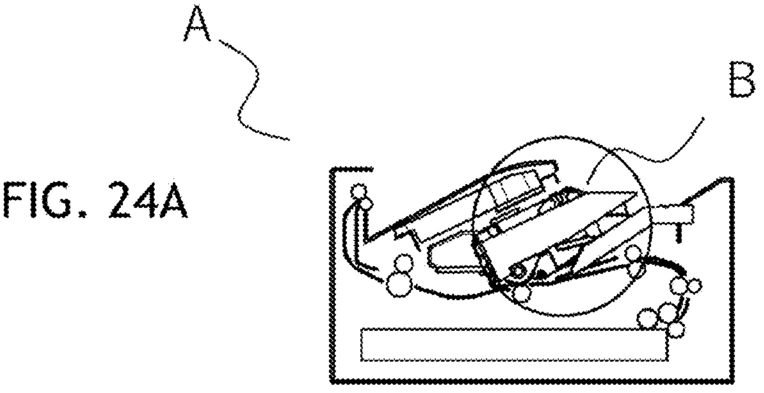
FIGS. 24A and 24B are diagrams illustrating a state where the cartridge B of the Embodiment 2 is completely attached.
Figure 24B:
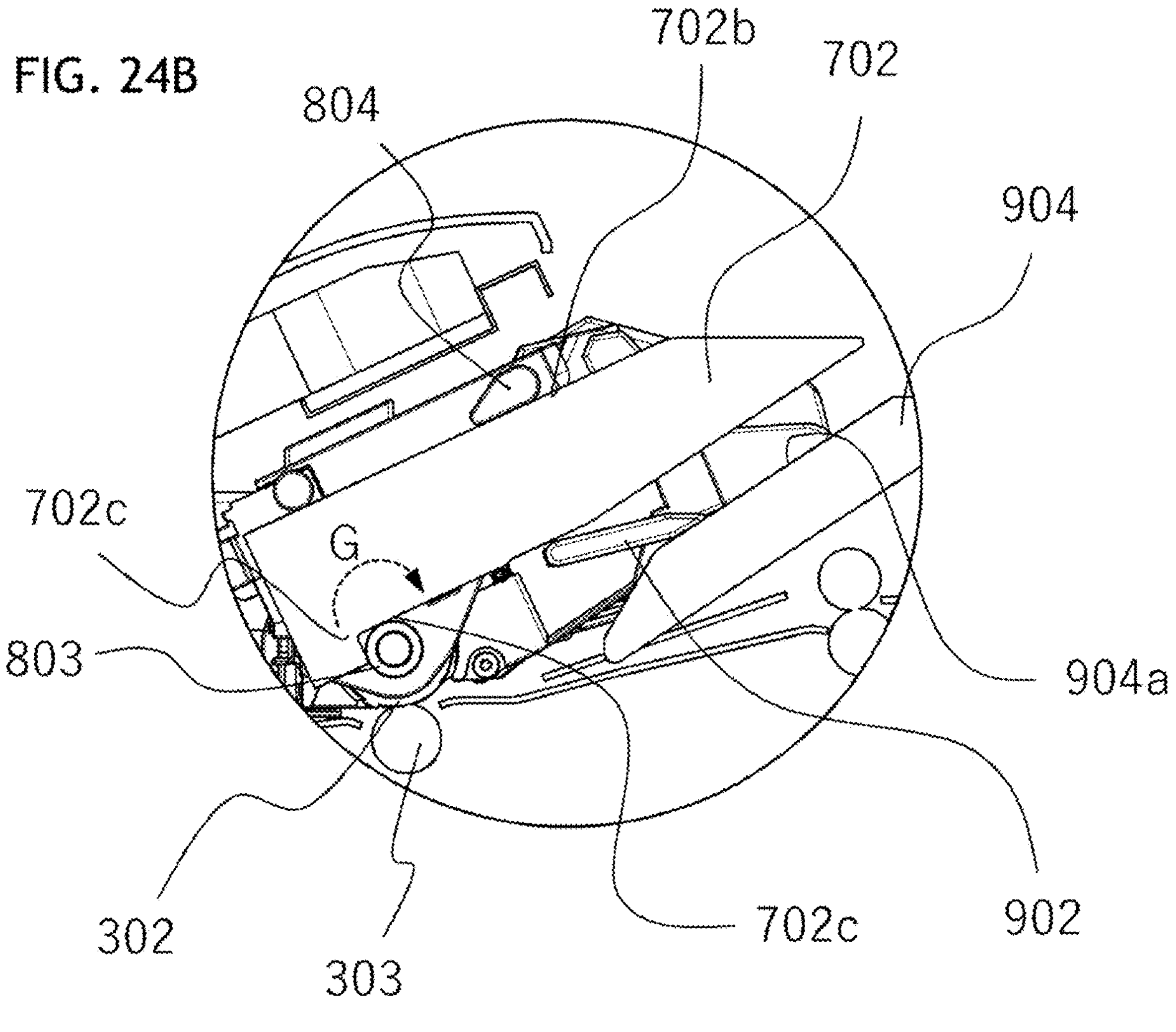

FIGS. 24A and 24B are a state where the insertion has further progressed in a direction of an arrow P4 from the state in FIGS. 23A and 23B, and the attachment is completed. This state shall be referred to as a third state of the cartridge B in this Embodiment. On the upper part of the lower guide member 904, the upper guide member 702 is fixed to the apparatus main body A. The upper guide member 702 has the attachment-time regulating portion 702*c* for contacting the guided portion 803 in the attachment completed state. The transfer roller 303 in this Embodiment is urged to the upper side by an urging member, not shown. As a result, the transfer roller 303 presses the photosensitive drum 302 to the upper side, and the guided portion 803 is brought into contact with the upper side of the attachment-time regulating portion 702*c* from the lower side.

In the cartridge B in this Embodiment, the rotation retaining portion 804 is disposed on the toner container 306 side with respect to the rotation shaft of the photosensitive drum 302. Moreover, the cartridge B is designed so as to generate a moment in a clockwise direction (arrow G direction) in FIGS. 24A and 24B around the rotation shaft of the photosensitive drum 302. As the result of that, the rotation retaining portion 804 is in contact with the rotation-retaining contact portion 702*b* of the upper guide member 702 all the time.

In the state where the cartridge B is completely inserted as above, the attitude is regulated by the contact of the attachment-time regulating portion 702*c* with the guided portion 803 and the contact of the rotation-retaining contact portion 702*b* with the rotation retaining portion 804.

At this time, the link member 902 is in a state of being placed on the guide portion 904*a* of the lower guide member 904. In this state, the link member 902 does not influence the attitude of the cartridge B.

As illustrated as above, even in the vicinity of the opening 602 in the beginning of the insertion of the cartridge B, the attitude, the insertion/removal trajectory of the cartridge B are regulated by the relation between the link member 902 and the lower guide member 904.

According to this Embodiment, as in a case where the opening is provided closer to the upper front side of the apparatus main body A than conventional, for example, even when the cartridge is to be attached to the image forming apparatus which needs to change the attitude of the cartridge B at the insertion/removal, the contact between the cartridge B (the waste-toner container 307 in this Embodiment) and the apparatus main body A (the stay member 704 in this Embodiment) can be avoided.

Moreover, even if the attitude or the insertion/removal trajectory of the cartridge B needs to be changed in the middle of the insertion to a greater extent than that illustrated in this Embodiment, it can be an be readily accommodated by adjusting the relationship among the guide portion 904*a*, the stop portion 904*d* of the apparatus main body A and the link member 902 of the cartridge B.

The insertion of the cartridge B has been specifically explained so far. When the cartridge B is to be removed, it is removed by going through the states opposite to the explanation so far. That is, at the removal, too, by means of the operation of the link member 902, contact between the cartridge B (waste-toner container 307) and the apparatus main body A (stay member 704) in the vicinity of the opening 602 can be avoided.

In this Embodiment, the guided portion 803 in the vicinity of the opening 602 is regulated between the guide portion 904*a* of the lower guide member 904 and the regulating portion 702*a* of the upper guide member 702. For example, if the weight of the cartridge B is sufficiently large, and the guided portion 803 and the guide portion 904*a* are brought into contact with each other only by the gravity force, there is no need for regulation between the guide portion 904*a* and the regulating portion 702*a*. Therefore, if the weight of the cartridge B is sufficiently heavy, the upper guide member 702 can be made shorter and smaller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-080692, filed on May 16, 2023, which is hereby incorporated by reference wherein in its entirety.

What is claimed is:

1. An image forming apparatus comprising:

an apparatus main body provided with an opening; and a cartridge configured to be capable of being inserted into or removed from the apparatus main body through the opening, the cartridge having:

a photosensitive drum, a guided portion, a link member with a contacted portion, and a shutter member having a drum-shutter contact portion, wherein the apparatus main body has:

a lower guide member fixed to the apparatus main body, the lower guide member having:

(i) a guide portion configured to guide the guided portion; and (ii) a contact portion continuing from the guide portion, the contact portion being disposed upstream of the guide portion in a cartridge insertion direction and configured to be in contact with the contacted portion of the link member, a stop portion configured to contact the drum-shutter contact portion, and wherein, when the cartridge is inserted into the apparatus main body, the cartridge is positionable in:

a first state where both the guided portion and the contacted portion of the link member are in contact with the contact portion, and the drum-shutter contact portion is spaced apart from the stop portion, whereby the cartridge is able to change the attitude by rotationally moving while the guided portion and the contacted portion maintain contact with the contact portion; and a second state, which is reached from the first state by further inserting the cartridge from the first state, where the guided portion is in contact with the guide portion, the contacted portion of the link member remains in contact with the contact portion, and the drum-shutter contact portion comes into contact with the stop portion to restrict rotation of the link member in the direction to cover the photosensitive drum, whereby the cartridge changes attitude by rotating about the guided portion under the restriction of the link member.

2. The image forming apparatus according to claim 1, wherein the cartridge is capable of being in a third state where the cartridge is at an attachment-completed position, when the cartridge is inserted, a state of the cartridge changes in order of the first state, the second state, and the third state, and when the cartridge is removed, the state of the cartridge changes in order of the third state, the second state, and the first state.

3. The image forming apparatus according to claim 2, wherein, when the cartridge is inserted into the apparatus main body, the cartridge transfers from the second state to the third state by moving while the guided portion is guided by the guide portion.

4. The image forming apparatus according to claim 2, wherein the guide portion has a slope angled with respect to a horizontal plane such that the guide portion has an upper region and a lower region, the contact portion located at the upper region of the guide portion, and the guided portion is located at the lower region in the attachment-completed position.

5. The image forming apparatus according to claim 4, wherein the contact portion extends substantially horizontally, and in the first state, the guided portion and the link member of the cartridge are configured to be brought into contact with the contact portion by a gravitational force.

6. The image forming apparatus according to claim 1, wherein the shutter member is coupled with the link member and is movable between a position where the photosensitive drum is covered and a position where the photosensitive drum is exposed, in accordance with rotation of the link member.

7. The image forming apparatus according to claim 6, wherein the cartridge is configured to change the attitude by rotationally moving in accordance with a rotation of the link member while maintaining contact between the contacted portion and the contact portion in the second state.

8. The image forming apparatus according to claim 6, wherein the link member has a rotation center, the rotation center being closer to an upstream side of the cartridge, relative to an insertion direction of the cartridge, than the photosensitive drum; and the link member is urged by an urging member in a direction in which the shutter member covers the photosensitive drum.

9. The image forming apparatus according to claim 1, wherein when the stop portion is brought into contact with the drum-shutter contact portion in the second state, rotation of the link member in the direction to cover the photosensitive drum is restricted.

10. The image forming apparatus according to claim 1, wherein a cover member covering a surface of the photosensitive drum is configured to be detachably attached to the cartridge; and when the cartridge is to be inserted into the apparatus main body, the cover member is removed.

* * * * *